(12) United States Patent
Yin et al.

(10) Patent No.: US 9,036,580 B2
(45) Date of Patent: May 19, 2015

(54) SYSTEMS AND METHODS FOR DYNAMICALLY CONFIGURING A FLEXIBLE SUBFRAME

(71) Applicant: Sharp Laboratories of America, Inc., Camas, WA (US)

(72) Inventors: Zhanping Yin, Vancouver, WA (US); Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 115 days.

(21) Appl. No.: 13/744,397

(22) Filed: Jan. 17, 2013

(65) Prior Publication Data

US 2014/0198733 A1    Jul. 17, 2014

(51) Int. Cl.
*H04W 72/04*    (2009.01)

(52) U.S. Cl.
CPC .................................. *H04W 72/0446* (2013.01)

(58) Field of Classification Search
None
See application file for complete search history.

(56) References Cited

U.S. PATENT DOCUMENTS

| 8,675,592 B2 * | 3/2014 | Gao et al. ..................... 370/329 |
| 2011/0176461 A1 * | 7/2011 | Astely et al. ................. 370/280 |
| 2011/0274015 A1 | 11/2011 | Astely et al. |
| 2012/0113875 A1 | 5/2012 | Alanärä et al. |
| 2013/0194931 A1 * | 8/2013 | Lee et al. ..................... 370/329 |
| 2013/0201936 A1 * | 8/2013 | Chen et al. ................... 370/329 |
| 2013/0336253 A1 * | 12/2013 | Lee .............................. 370/329 |

FOREIGN PATENT DOCUMENTS

| EP | 2392183 | 12/2011 |
| EP | 2517379 | 10/2012 |
| WO | 2012/167431 | 12/2012 |

OTHER PUBLICATIONS

Ericsson, "Finalization for Introducing of Rel-11 Features," 3GPP TSG-RAN WG1 Meeting #71, R1-125402, Nov. 2012.
Editor (Motorola Mobility), "Finalization for Introducing Rel-11 Features," 3GPP TSG-RAN WG1 Meeting #71, R1-125404, Nov. 2012.
Catt, "TR36.828 v2.0.0 for Rel-11 FS_LTE_TDD_eIMTA," 3GPP TSG RAN WG1 Meeting #69, R1-122950, May 2012.
Catt, "New Work Item Proposal for Further Enhancements to LTE TDD for DL-UL Interference Management and Traffic Adaptation," 3GPP TSG-RAN Meeting #58, RP-121772, Dec. 2012.
Huawei, "Finalization for Introducing Rel-11 Features," 3GPP TSG-RAN WG1 Meeting #71, R1-125403, Nov. 2012.

* cited by examiner

*Primary Examiner* — Donald Mills
(74) *Attorney, Agent, or Firm* — Austin Rap & Hardman

(57) ABSTRACT

A user equipment (UE) for dynamically configuring a flexible subframe is described. The UE includes a processor and instructions stored in memory that is in electronic communication with the processor. The UE determines that a subframe is a flexible subframe. The UE determines whether a downlink is indicated for the flexible subframe. The UE sets the flexible subframe as a downlink subframe if a downlink is indicated.

26 Claims, 14 Drawing Sheets

SYSTEMS AND METHODS FOR DYNAMICALLY CONFIGURING A FLEXIBLE SUBFRAME

TECHNICAL FIELD

The present disclosure relates generally to communication systems. More specifically, the present disclosure relates to systems and methods for dynamically configuring a flexible subframe.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, inefficient communication resource usage consumes energy and other network resources. As illustrated by this discussion, systems and methods that improve energy consumption and/or network efficiency may be beneficial.

BRIEF DESCRIPTION OF THE DRAWINGS

FIG. 8 is a diagram illustrating some UL-DL configurations that the systems and methods disclosed herein may be applied to;

DETAILED DESCRIPTION

Figure 1:
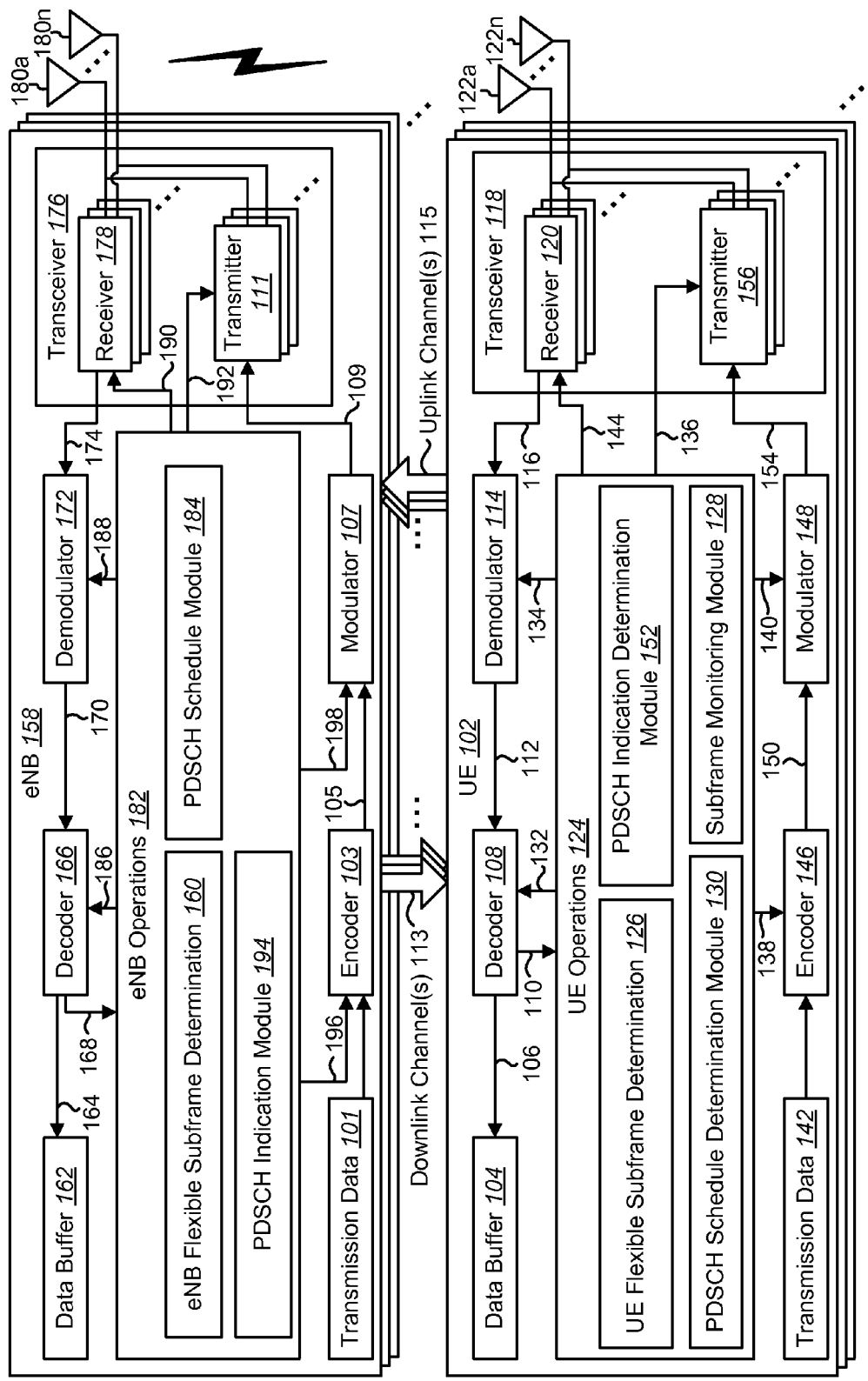
FIG. 1 is a block diagram illustrating one configuration of one or more evolved Node Bs (eNBs) and one or more User Equipments (UEs) in which systems and methods for dynamically configuring a flexible subframe may be implemented.

A UE for dynamically configuring a flexible subframe is described. The UE includes a processor and memory in electronic communication with the processor. Instructions stored in the memory are executable to determine that a subframe is a flexible subframe. The instructions are also executable to determine whether a downlink is indicated for the flexible subframe. The instructions are further executable to set the flexible subframe as a downlink subframe.

The instructions may be executable to monitor for a PDCCH and/or an EPDCCH for a downlink for the flexible subframe in the flexible subframe if a downlink is indicated. The instructions may be further executable to avoid monitoring for a PDCCH and/or an EPDCCH for a downlink in the flexible subframe if a downlink is not indicated. Determining whether a downlink is indicated may include monitoring for an indication subframe that is previous to the flexible subframe. The indication subframe may be a closest downlink subframe before the flexible subframe.

A UE for dynamically configuring a flexible subframe is described. The UE includes a processor and memory in electronic communication with the processor. Instructions stored in the memory are executable to monitor for a PDCCH and/or an EPDCCH for a downlink for the flexible subframe. The instructions are also executable to determine whether a PDSCH is scheduled for the flexible subframe.

Monitoring for a PDCCH and/or an EPDCCH may include monitoring for a PDCCH and/or an EPDCCH in a scheduling subframe that is previous to the flexible subframe. The scheduling subframe may be a closest downlink subframe before the flexible subframe.

An eNB for dynamically configuring a flexible subframe as a downlink subframe is described. The eNB includes a processor and memory in electronic communication with the processor. Instructions stored in the memory are executable to determine that a subframe is a flexible subframe. The instructions are also executable to indicate a downlink for the flexible subframe via an indication subframe that is previous to the flexible subframe.

Determining whether a subframe is a flexible subframe may include determining whether a subframe type is different in a first reference UL-DL configuration and a second reference UL-DL configuration. The indication subframe may be a closest downlink subframe before the flexible subframe.

The instructions may be further executable to schedule the downlink for the flexible subframe. Indicating the downlink and scheduling the downlink may be performed by a PDCCH or an EPDCCH in the indication subframe. Indicating the downlink may include sending a downlink indication in the indication subframe, and scheduling the downlink may be performed by a PDCCH or an EPDCCH in the flexible subframe. Scheduling a downlink may be based on a PUSCH scheduling timing. Scheduling a downlink may include sending a subframe offset value that indicates a number of subframes between the indication subframe and the flexible subframe.

A method for dynamically configuring a flexible subframe by a UE is described. The method includes determining that a subframe is a flexible subframe. The method also includes determining whether a downlink is indicated for the flexible subframe. The method further includes setting the flexible subframe as a downlink subframe.

A method for dynamically configuring a flexible subframe by a UE is described. The method includes determining that a subframe is a flexible subframe. The method also includes monitoring for a PDCCH and/or an EPDCCH for a downlink for the flexible subframe. The method also includes determining whether a PDSCH is scheduled for the flexible subframe.

A method for dynamically configuring a flexible subframe as a downlink subframe by an eNB is described. The method includes determining that a subframe is a flexible subframe. The method also includes indicating a downlink for the flexible subframe via an indication subframe that is previous to the flexible subframe.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may refer to any communication channel(s) over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and, in the case of a downlink transmission, those cells for which the UE decodes a PDSCH. "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Enhanced interference mitigation with traffic adaptation (eIMTA) is a topic for time-division duplex (TDD) LTE networks and may enable more flexible use of a transmission spectrum using dynamic uplink-downlink (UL-DL) allocation based on traffic load. With eIMTA, the UL-DL configuration may be dynamically changed. For example, some subframes, called flexible subframes, may be used as either downlink subframes or uplink subframes and may be converted between the two. According to some configurations, a flexible subframe may be used as a downlink subframe only if a PDSCH is scheduled in a previous fixed downlink subframe. Dynamic conversion of a flexible subframe may be one feature of eIMTA. The systems and methods disclosed herein describe UE behavior with eIMTA support and energy savings.

The systems and methods disclosed herein may dynamically configure a flexible subframe as a downlink subframe. Some implementations of the systems and methods describe PDSCH scheduling and downlink indication (or downlink grant) approaches for a flexible subframe. In particular, an indication subframe may indicate a PDSCH for a flexible subframe. The indication subframe may be transmitted before the flexible subframe and may be received before the flexible subframe. In some implementations, a UE may monitor a flexible subframe as a downlink subframe when a PDSCH is indicated for the flexible subframe. In some implementations, a PDSCH may also be scheduled for a flexible subframe by the indication subframe that comes before the flexible subframe. Accordingly, the indication subframe may include one or more of a downlink indication (e.g., a downlink grant) and a PDCCH (or an enhanced physical downlink control channel (EPDCCH)). A subframe that includes a PDCCH for scheduling a PDSCH (e.g., for indicating resources allocated for the PDSCH) may be referred to as a scheduling subframe. For example, when the indication subframe includes a PDCCH for scheduling the PDSCH in the flexible subframe, the indication subframe may also be referred to as a scheduling subframe.

According to some implementations, a PDCCH (or EPDCCH) in the indication subframe may be used to schedule a PDSCH in a flexible subframe. In one approach, a flexible subframe where a PDSCH is scheduled (by the downlink control information (DCI)) may be identified with a pre-defined association timing. In other words, a PDSCH in a flexible subframe may be scheduled by an associated downlink subframe. For example, the same PUSCH scheduling timing for the flexible subframe may be reused for cross-transmission time interval (cross-TTI) PDSCH scheduling.

In another approach, the flexible subframe, where the PDSCH is scheduled by the DCI for example, may be identified in the earlier subframe by the indication of a subframe offset value that identifies the flexible subframe. For example, the subframe offset value may identify the number of subframes between the indication subframe and the flexible subframe. In another example, the offset may be indicated by an index number in a set of associations with the indication subframe. For example, if there are two flexible subframes that are associated with an indication subframe, an index number can be used to show whether the indication is for the first flexible subframe or the second flexible subframe in the set of subframes.]

In this implementation, the systems and methods disclosed herein may extend a downlink control information (DCI) format for PDSCH scheduling. For example, additional bits may be added to differentiate between cross-transmission time interval (cross-TTI) PDSCH scheduling and normal PDSCH scheduling in the same TTI. The additional bits may also indicate the TTI offset (e.g., the number of subframes between the indication subframe and the flexible subframe) for the PDSCH transmission. In some implementations, downlink control information may transport downlink or uplink scheduling information, request aperiodic channel quality indicator (CQI) reports, notify of multicast control channel (MCCH) change and uplink power control commands for one cell and one radio network temporary identities (RNTI). In either implementation, a network may be configured with a large number of flexible subframes, so that the UE can save energy by monitoring only the fixed downlink subframes and the flexible subframes with a PDSCH scheduled for downlinks.

In another implementation, a downlink indication in the indication subframe and a PDCCH (or EPDCCH) in the flexible subframe may be used to schedule a PDSCH in the flexible subframe. For example, a downlink indication (or a downlink grant) for the flexible subframe may be transmitted in the indication subframe prior to the flexible subframe. The indication subframe with the downlink indication (or downlink grant) may not include detailed PDSCH resource allocation information or a PDCCH (or EPDCCH). In other words, the downlink indication (or downlink grant) may only notify a UE that there will be a downlink in a flexible subframe. A UE may then monitor the flexible subframe and may detect a PDCCH (or an EPDCCH) and may monitor for a PDSCH transmission to the UE, if any.

In some implementations, the flexible subframe that corresponds to the downlink indication (or downlink grant) may be identified by a pre-defined association timing, as described in connection with an indication frame that includes a PDCCH with PDSCH resource allocation information, for example. In some implementations, the downlink indication (or downlink grant) association timing may reuse the PUSCH scheduling timing.

Depending on the indication subframe configuration (e.g., a PDCCH (or an EPDCCH) in the indication subframe or a downlink indication (or downlink grant) in the indication subframe), a UE may or may not detect a PDCCH (or an EPDCCH) in the flexible subframe. Accordingly, UE behavior with unused (or muted) flexible subframes is described. Unused (or muted) flexible subframes are those flexible subframes where no PDSCH is scheduled and where no physical uplink shared channel (PUSCH) is scheduled.

The methods and systems described herein may include dynamic reconfiguration by one or more of system-level information changes, radio resource control (RRC) layer signaling, media access control (MAC) layer signaling and physical (PHY) layer signaling. Among these options, the PHY layer signaling may provide benefits in terms of better flexibility and lowest reconfiguration time for dynamic time-division duplex (TDD) UL-DL reconfiguration. In this disclosure, systems and methods are described for PHY layer signaling to configure or convert a flexible subframe into a downlink subframe. To increase the network and energy savings, the network may not monitor a flexible subframe unless it is scheduled for transmission or reception. Accordingly, the systems and methods disclosed herein provide UE behavior with eIMTA and describe an unused (or muted) state for a flexible subframe.

The systems and methods disclosed herein describe UE behavior of subframe processing with eIMTA support. An unused state is also described for the flexible subframes. The systems and methods disclosed herein may be beneficial as a network may be configured with a large number of flexible subframes, so that the UE can save energy by monitoring the fixed downlink subframes. For example, In current TDD systems, a UE may monitor all downlink subframes DL subframes to: obtain a PDCCH (or an EPDCCH), schedule a PDSCH transmission in the same DL subframe, schedule a PUSCH in a downlink subframe n for an uplink subframe n+k (where k may be decided by the PUSCH scheduling timing), use one or more of a physical hybrid automatic repeat request indicator channel (PHICH), PDCCH and EPDCCH to send a hybrid automatic repeat request acknowledge (HARQ-ACK) information for a previous PUSCH transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs 158 (eNBs) and one or more User Equipments 102 (UEs) in which systems and methods for dynamically configuring a flexible subframe may be implemented. The one or more UEs 102 may communicate with the one or more eNBs 158 using one or more antennas 122a-n. For example, a UE 102 transmits electromagnetic signals to the eNB 158 and receives electromagnetic signals from the eNB 158 using the one or more antennas 122a-n. The eNB 158 communicates with the UE 102 using one or more antennas 180a-n.

The UE 102 and the eNB 158 may use one or more channels 113, 115 to communicate with each other. For example, a UE 102 may transmit information or data to the eNB 158 using one or more uplink channels 115. Examples of uplink channels 115 include a physical uplink control channel (PUCCH) and a physical uplink shared channel (PUSCH), etc. The one or more eNBs 158 may also transmit information or data to the one or more UEs 102 using one or more downlink channels 113, for instance. Examples of downlink channels 113 include a PDCCH, a PDSCH, etc. Other kinds of channels may be used.

Each of the one or more UEs 102 may include one or more transceivers 118, one or more demodulators 114, one or more decoders 108, one or more encoders 146, one or more modulators 148, a data buffer 104 and a UE operations module 124. For example, one or more reception and/or transmission paths may be implemented in the UE 102. For convenience, only a single transceiver 118, decoder 108, demodulator 114, encoder 146 and modulator 148 are illustrated in the UE 102, though multiple parallel elements (e.g., transceivers 118, decoders 108, demodulators 114, encoders 146 and modulators 148) may be implemented.

The transceiver 118 may include one or more receivers 120 and one or more transmitters 156. The one or more receivers 120 may receive signals from the eNB 158 using one or more antennas 122a-n. For example, the receiver 120 may receive and downconvert signals to produce one or more received signals 116. The one or more received signals 116 may be provided to a demodulator 114. The one or more transmitters 156 may transmit signals to the eNB 158 using one or more antennas 122a-n. For example, the one or more transmitters 156 may upconvert and transmit one or more modulated signals 154.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 158. The UE operations module 124 may include a UE flexible subframe determination module 126, a PDSCH indication determination module 152, a PDSCH schedule determination module 130 and a subframe monitoring module 128.

Figure 7:
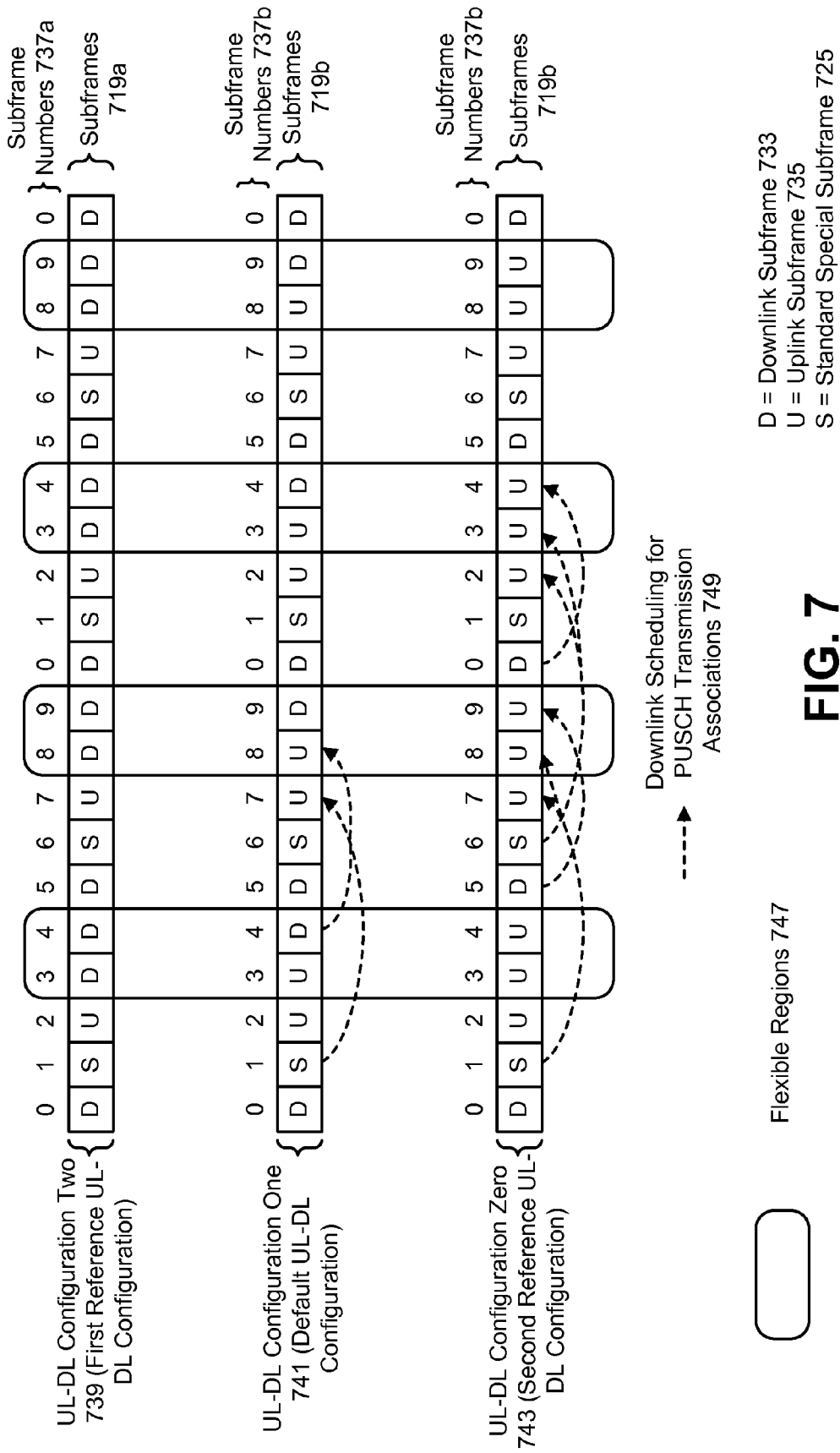
FIG. 7 is a diagram illustrating one example of uplink and downlink (UL-DL) configurations that may be utilized in accordance with the systems and methods disclosed herein.

The UE flexible subframe determination module 126 may determine whether a subframe is a flexible subframe. A flexible subframe is a subframe that may be a downlink subframe or an uplink subframe. For example, in some implementations, a flexible subframe may be an uplink subframe in at least one case (e.g., a first configuration selected from a dynamic UL-DL reconfiguration range) and may be a downlink subframe in at least one other case (e.g., a first configuration selected from a dynamic U-DL reconfiguration range). By comparison, a fixed subframe may maintain the same uplink or downlink direction in one or more cases (e.g., one or more configurations selected from a dynamic UL-DL reconfiguration range). For example, as illustrated by FIG. 7 below, a flexible subframe may be used as a downlink subframe in one UL-DL configuration and an uplink subframe in another UL-DL configuration. A flexible subframe may be used as an uplink subframe if a PUSCH transmission is scheduled in the flexible subframe. In some implementations, the PUSCH scheduling may be signaled by PDCCH or EPDCCH, (with DCI format 0/4, for example). For example, DCI format 0/4 may be utilized for an uplink grant (e.g., PUSCH scheduling). In some implementations, the PUSCH scheduling association timing rules may be those defined in 3GPP TS 36.213 for a single TDD cell, and for more than one TDD cell within the same or different TDD UL-DL configurations. A flexible subframe may be used as a downlink subframe if a PDSCH is scheduled in the flexible subframe (by a previous fixed downlink subframe, for example). Accordingly, in a cell with eIMTA support, there may be one or more fixed downlink subframes, fixed special subframes, fixed uplink subframes and flexible subframes.

In some implementations, the UE flexible subframe determination module 126 may determine that a subframe is a flexible subframe based on received information. For example, the UE flexible subframe determination module 126 may receive an indication from the eNB 158 (based on PHY layer signaling, for example) that a subframe is a flexible subframe.

Optionally, in some implementations, whether a subframe is a flexible subframe may be determined based on multiple UL-DL reference configurations (e.g., a first reference UL-DL configuration and a second reference UL-DL configuration). The UL-DL reference configurations may be based on a default UL-DL configuration. The default UL-DL configuration may be an UL-DL configuration specified by an eNB for all UEs. For a given default UL-DL configuration, a dynamic UL-DL reconfiguration range may be any combination of the seven standard TDD UL-DL configurations, provided that the default UL-DL configuration is within the reconfiguration range. In some implementations, the first reference UL-DL configuration may be a UL-DL configuration in the dynamic UL-DL reconfiguration range, with a minimum number of uplink subframes. For a UE 102 that supports eIMTA in a cell with eIMTA support, the first reference UL-DL configuration may be used as the PDSCH timing reference. Accordingly, the PDSCH scheduling and PDSCH HARQ-ACK bits reporting may be based on the first reference UL-DL configuration.

By comparison, the second reference UL-DL configuration may be a UL-DL configuration in the dynamic UL-DL reconfiguration range with a minimum number of downlink subframes (minimum as selected from a set of UL-DL configurations, for example). The first reference UL-DL configuration should include more downlink subframes than the second reference UL-DL configuration. In some implementations, the first reference UL-DL configuration may be the same as the second reference UL-DL configuration. In this implementation eIMTA may not be used. For a UE 102 that supports eIMTA in a cell with eIMTA support, the second reference UL-DL configuration may be used as the PUSCH timing reference. Accordingly, the PUSCH scheduling and PUSCH HARQ-ACK bits reporting may be based on the second reference UL-DL configuration.

As stated above, determining that a subframe is a flexible subframe may be based on the first reference UL-DL configuration and the second reference UL-DL configuration. For example, if a subframe is one type in the first reference UL-DL configuration (e.g., the subframe is a downlink subframe) and is another type in the second reference UL-DL configuration (e.g., the subframe is an uplink subframe), it may be a flexible subframe.

The PDSCH indication determination module 152 may determine if a downlink is indicated for the flexible subframe. For example, the PDSCH indication determination module 152 may determine whether a PDSCH is indicated for the flexible subframe based on an indication subframe that is earlier than the flexible subframe. In some implementations, the PDSCH indication determination module 152 may receive the indication subframe from the eNB 158. The indication subframe may include a PDCCH. The PDCCH may indicate a downlink for the flexible subframe. In another example, the indication subframe may include an EPDCCH that indicates a downlink for the flexible subframe. In these examples, the indication subframe may also include PDSCH resource allocation information (included in a PDCCH or EPDCCH, for instance) that may be utilized in scheduling a downlink.

In other implementations, the PDSCH indication determination module 152 may determine whether a downlink is indicated based on an indication subframe that does not include a PDCCH (or an EPDCCH) with PDSCH resource allocation information for the indicated subframe. For example, the PDSCH indication determination module 152 may receive an indication subframe from the eNB 158 that includes a downlink indication (or downlink grant) that notifies the UE 102 that a flexible subframe may be used as a downlink subframe. In this example, the indication subframe may not include a PDCCH (or EPDCCH) with PDSCH resource allocation information for the indicated subframe. However, it should be noted that in some cases one or more other PDCCHs or EPDCCHs may be included in the indication subframe for other purposes such as normal operation (besides scheduling a PDSCH for the flexible subframe). Accordingly, the flexible subframe may include the PDCCH (or EPDCCH). The UE 102 may then monitor the flexible subframe to detect the PDCCH (or EPDCCH) for PDSCH scheduling information (e.g., resource allocation information). Thus, a downlink grant may be issued in the indication subframe (which may include many approaches including a modified PDCCH or EPDCCH).

In some implementations, the downlink indication (or downlink grant) included in the indication subframe may be cell-specific or UE-specific. In other words, the downlink indication may be directed to a transmission cell (with multiple UEs 102) or to one or more UE(s) 102 within a transmission cell. If the downlink indication is cell-specific, all UEs 102 in the cell may monitor the flexible subframe for the PDCCH and PDSCH. By comparison, if the downlink indication (or downlink grant) is UE-specific, only targeted UE(s) 102 may need to monitor the flexible subframe for the PDCCH and the PDSCH.

In some implementations, the UE 102 may include a PDSCH schedule determination module 130 that may determine whether a PDSCH is scheduled for the flexible subframe. Optionally, the PDSCH schedule determination module 130 may determine a PDSCH schedule for the flexible subframe based on an indication subframe. For example, the PDSCH schedule determination module 130 may receive a scheduling subframe from the eNB 158 that includes a PDCCH. The PDCCH may schedule a PDSCH for the flexible subframe (e.g., may indicate resources allocated for the PDSCH). In another example, the scheduling subframe may include an EPDCCH that schedules the PDSCH for the flexible subframe. In these examples, the scheduling subframe may also include PDSCH resource allocation information that may be utilized to schedule a downlink.

In other implementations, the PDSCH schedule determination module 130 may determine a downlink schedule based on a PDCCH (or an EPDCCH) that is included in the flexible subframe. For example, as described above, the UE 102 may receive an indication subframe from the eNB 158 that includes a downlink indication (or downlink grant) that notifies the UE 102 that a flexible subframe may be used as a downlink subframe. In this example, the indication subframe may not include a PDCCH (or EPDCCH) with PDSCH resource allocation information for the indicated subframe. Accordingly, the flexible subframe may include the PDCCH (or EPDCCH). The PDSCH schedule determination module 130 may then monitor the flexible subframe to decode the PDCCH (or EPDCCH) to determine a PDSCH schedule.

In some implementations, the downlink indication (or downlink grant) included in the indication subframe may be cell-specific or UE-specific. In other words, the downlink indication may be directed to a transmission cell (with multiple UEs 102) or to one or more UE(s) 102 within a transmission cell. If the downlink indication is cell-specific, all UEs 102 in the cell may monitor the flexible subframe for the PDCCH and PDSCH. By comparison, if the downlink indication (or downlink grant) is UE-specific, only targeted UE(s) 102 may need to monitor the flexible subframe for the PDCCH and the PDSCH.

The subframe monitoring module 128 may monitor a flexible subframe (when a PDSCH is scheduled and/or indicated, for instance). For example, the subframe monitoring module 128 may monitor a flexible subframe for one or more of a PDCCH (or an EPDCCH) and a PDSCH. In one implementation, the indication subframe may include a downlink indication (or a downlink grant) that does not include a PDCCH (or EPDCCH) with PDSCH resource allocation information for the indicated subframe as described above. In this implementation, the UE 102 may set the flexible subframe as a downlink subframe (if a downlink is indicated, for example). For example, the subframe monitoring module 128 may monitor for a PDCCH and/or an EPDCCH for a downlink for the flexible subframe in the flexible subframe if a downlink is indicated. In this implementation, the subframe monitoring module 128 may monitor the flexible subframe for the PDCCH (or EPDCCH) that schedules the PDSCH. If the subframe monitoring module 128 detects a PDCCH (or EPDCCH) in the flexible subframe, the subframe monitoring module 128 may monitor the flexible subframe for a downlink (e.g., PDSCH).

In other implementations, a UE 102 may receive an indication subframe that includes a PDCCH (or EPDCCH) that indicates a PDSCH for the flexible subframe. In this example, if the PDCCH (or EPDCCH) indicates a PDSCH for the flexible subframe, the subframe monitoring module 128 may monitor the flexible subframe for a downlink (e.g., PDSCH). By comparison, if the indication subframe does not indicate a PDSCH (by the absence of a PDCCH, for example), the subframe monitoring module 128 may avoid monitoring the flexible subframe for a downlink.

Monitoring for a downlink based on whether a PDSCH has been indicated may be beneficial as it reduces energy consumption. For example, if a PDSCH has not been indicated, the UE 102 may not need to monitor the flexible subframe and thereby the UE 102 may conserve energy and network resources.

The UE operations module 124 may provide information 144 to the one or more receivers 120. For example, the UE operations module 124 may inform the receiver(s) 120 when to receive transmissions (based on a PDSCH schedule, for example).

The UE operations module 124 may provide information 134 to the demodulator 114. For example, the UE operations module 124 may inform the demodulator 114 of a modulation pattern anticipated for transmissions from the eNB 158.

The UE operations module 124 may provide information 132 to the decoder 108. For example, the UE operations module 124 may inform the decoder 108 of an anticipated encoding for transmissions from the eNB 158.

The UE operations module 124 may provide information 138 to the encoder 146. The information 138 may include data to be encoded and/or instructions for encoding. For example, the UE operations module 124 may instruct the encoder 146 to encode transmission data 142 and/or other information 138.

The encoder 146 may encode transmission data 142 and/or other information 138 provided by the UE operations module 124. For example, encoding the data 142 and/or other information 138 may involve error detection and/or correction coding, mapping data to space, time and/or frequency resources for transmission, multiplexing, etc. The encoder 146 may provide encoded data 150 to the modulator 148.

The UE operations module 124 may provide information 140 to the modulator 148. For example, the UE operations module 124 may inform the modulator 148 of a modulation type (e.g., constellation mapping) to be used for transmissions to the eNB 158. The modulator 148 may modulate the encoded data 150 to provide one or more modulated signals 154 to the one or more transmitters 156.

The UE operations module 124 may provide information 136 to the one or more transmitters 156. This information 136 may include instructions for the one or more transmitters 156. For example, the UE operations module 124 may instruct the one or more transmitters 156 when to transmit a signal to the eNB 158. For instance, the one or more transmitters 156 may transmit during a UL subframe. The one or more transmitters 156 may upconvert and transmit the modulated signal(s) 154 to one or more eNBs 158.

The eNB 158 may include one or more transceivers 176, one or more demodulators 172, one or more decoders 166, one or more encoders 103, one or more modulators 107, a data buffer 162 and an eNB operations module 182. For example, one or more reception and/or transmission paths may be implemented in an eNB 158. For convenience, only a single transceiver 176, decoder 166, demodulator 172, encoder 103 and modulator 107 are illustrated in the eNB 158, though multiple parallel elements (e.g., transceivers 176, decoders 166, demodulators 172, encoders 103 and modulators 107) may be implemented.

The transceiver 176 may include one or more receivers 178 and one or more transmitters 111. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 111 may transmit signals to the UE 102 using one or more antennas 180a-n. For example, the one or more transmitters 111 may upconvert and transmit one or more modulated signals 109.

The demodulator 172 may demodulate the one or more received signals 174 to produce one or more demodulated signals 170. The one or more demodulated signals 170 may be provided to the decoder 166. The eNB 158 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data.

In general, the eNB operations module 182 may enable the eNB 158 to communicate with the one or more UEs 102. The eNB operations module 182 may include an eNB flexible subframe determination module 160, a PDSCH indication module 194 and a PDSCH schedule module 184.

The eNB flexible subframe determination module 160 may determine that a subframe is a flexible subframe. As described above, a flexible subframe is a subframe that is configured to be used as a downlink subframe and an uplink subframe.

In some implementations, the eNB flexible subframe determination module 160 may determine that a subframe is a flexible subframe based on reference UL-DL configurations. For example, the eNB 158 may configure the UE 102 with multiple reference UL-DL configurations. The eNB flexible subframe determination module 160 may determine subframes of different types (e.g., uplink and downlink or special) between the reference UL-DL configurations.

Optionally, as will be described in FIG. 7 below, the eNB flexible subframe determination module 160 in some implementations may determine that a subframe is a flexible subframe based on a first reference UL-DL configuration and a second reference UL-DL configuration. If a subframe is one type in the first reference UL-DL configuration (e.g., the subframe is a downlink subframe) and is another type in the second reference UL-DL configuration (e.g., the subframe is an uplink subframe), then the subframe may be a flexible subframe.

In some implementations, the eNB flexible subframe determination module 160 may pass information indicating that a subframe is a flexible subframe. For example, the eNB flexible subframe determination module 160 may signal to the UE 102 (based on PHY layer signaling, for example) that a subframe is a flexible subframe.

The PDSCH indication module 194 may indicate a downlink (and/or a PDSCH) for the flexible subframe. For example, the PDSCH indication module 194 may send a signal to the UE 102 indicating a downlink (or a PDSCH) for a flexible subframe. For example, the PDSCH indication module 194 may indicate a downlink based on an indication subframe that is previous to the flexible subframe. The indication subframe may be a closest downlink subframe before the flexible subframe. For example, as described above, the indication subframe may include a PDCCH (or EPDCCH). In this example, the PDCCH (or EPDCCH) in the indication subframe may indicate a PDSCH for the flexible subframe to the UE 102. As will be described below, in some implementations, the PDCCH (or EPDCCH) may also schedule the downlink.

In another example, the PDSCH indication module 194 may indicate a PDSCH via an indication subframe that includes a downlink indication (or downlink grant). The downlink indication (or downlink grant) may signal or indicate to the UE 102 a PDSCH for the flexible subframe. In this example, the indication subframe may not include a PDCCH (or EPDCCH) to schedule a PDSCH in the flexible subframe (e.g., indicated subframe). Accordingly, the indication subframe may indicate a PDSCH for a flexible subframe without providing detailed scheduling information.

In some implementations, the downlink indication (or downlink grant) included in the indication subframe may be cell-specific or UE-specific. In other words, the downlink indication may be directed to a transmission cell (with multiple UEs 102), or to one or more UE(s) 102 within a transmission cell. If the downlink indication is cell-specific, all UEs 102 in the cell may monitor the flexible subframe for the PDCCH (or EPDCCH) and PDSCH. By comparison, if the downlink indication (or downlink grant) is UE-specific, only targeted UE(s) 102 may need to monitor the flexible subframe for the PDCCH (or EPDCCH) and the PDSCH.

In some implementations, the eNB 158 may schedule a downlink. In these implementations, the PDSCH schedule module 184 may schedule a downlink for the flexible subframe. In some implementations, the PDSCH schedule module 184 may schedule the downlink via a scheduling subframe that is previous to the flexible subframe. For example, the scheduling subframe may include a PDCCH (or EPDCCH) that schedules the PDSCH in the flexible subframe.

In other implementations, the PDSCH schedule module 184 may schedule a downlink with a PDCCH (or EPDCCH) in a flexible subframe. For example, an indication subframe may include a downlink indication indicating that a flexible subframe is a downlink subframe (e.g., that the flexible subframe may include a PDSCH) but does not include a PDCCH (or EPDCCH) with PDSCH resource allocation information for the indicated subframe. In this example, the PDSCH schedule module 184 may schedule a PDSCH with a PDCCH (or EPDCCH) included in the flexible subframe. More detail regarding scheduling a flexible subframe is given below in connection with one or more of FIGS. 2, 3, 5 and 6.

The eNB operations module 182 may provide information 190 to the one or more receivers 178. The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 196 to the encoder 103. The information 196 may include data to be encoded and/or instructions for encoding. For example, the eNB operations module 182 may instruct the encoder 103 to encode transmission data 101 and/or other information 196.

The encoder 103 may encode transmission data 101 and/or other information 196 provided by the eNB operations module 182. For example, encoding the data 101 and/or other information 196 may involve error detection and/or correction coding, mapping data to space, time and/or frequency resources for transmission, multiplexing, etc. The encoder 103 may provide encoded data 105 to the modulator 107. The transmission data 101 may include network data to be relayed to the UE 102.

The eNB operations module 182 may provide information 198 to the modulator 107. This information 198 may include instructions for the modulator 107. For example, the eNB operations module 182 may inform the modulator 107 of a modulation type (e.g., constellation mapping) to be used for transmissions to the UE(s) 102. The modulator 107 may modulate the encoded data 105 to provide one or more modulated signals 109 to the one or more transmitters 111.

The eNB operations module 182 may provide information 192 to the one or more transmitters 111. This information 192 may include instructions for the one or more transmitters 111. For example, the eNB operations module 182 may instruct the one or more transmitters 111 when to (or when not to) transmit a signal to the UE(s) 102. In some implementations, this may be based on an UL-DL configuration. The one or more transmitters 111 may upconvert and transmit the modulated signal(s) 109 to one or more UEs 102.

It should be noted that a downlink (DL) subframe may be transmitted from the eNB 158 to one or more UEs 102 and that an uplink (UL) subframe may be transmitted from one or more UEs 102 to the eNB 158. Furthermore, both the eNB 158 and the one or more UEs 102 may transmit data in a standard special subframe.

It should also be noted that one or more of the elements or parts thereof included in the eNB(s) 158 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
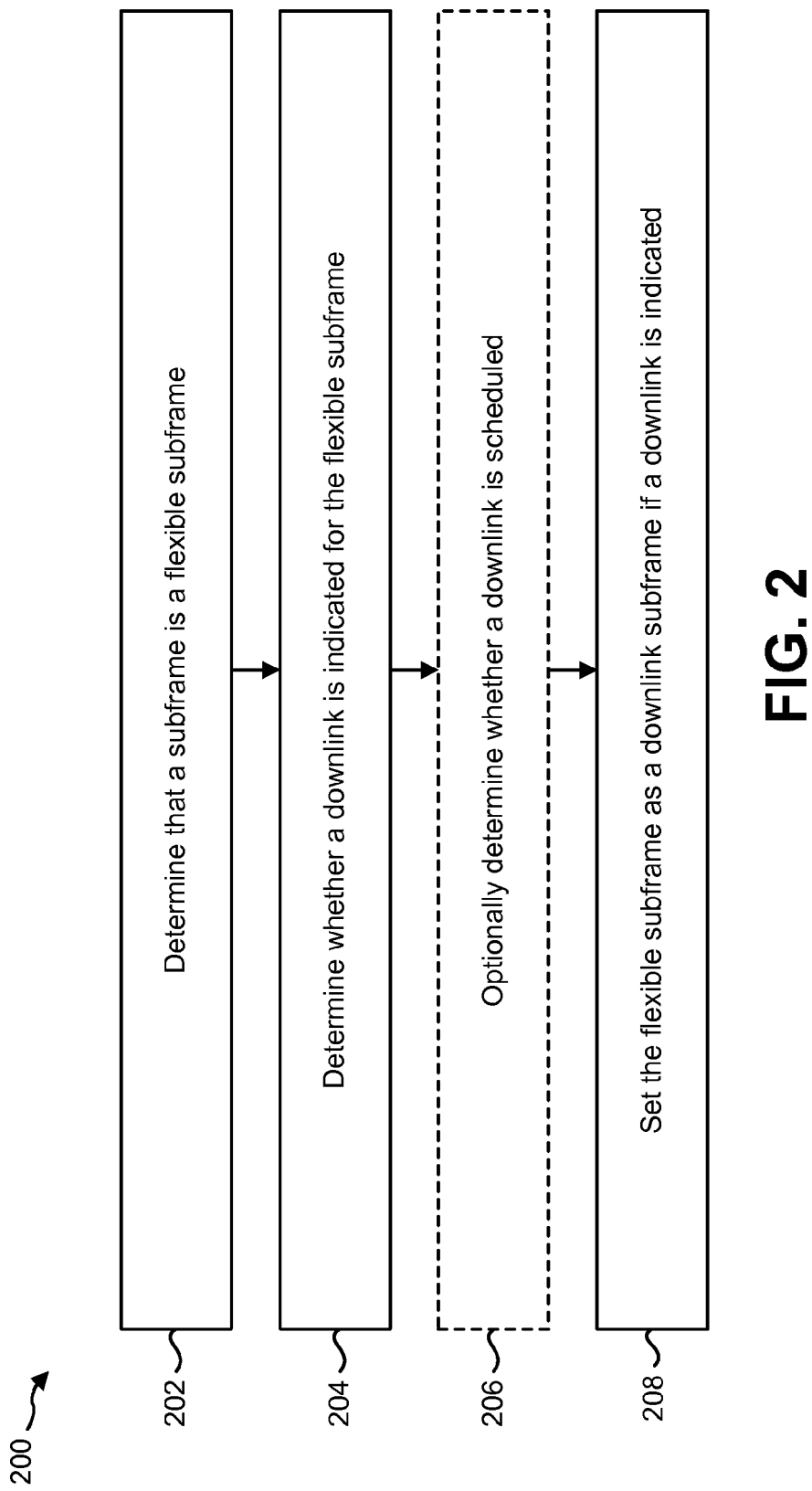
FIG. 2 is a flow diagram illustrating one configuration of a method for dynamically configuring a flexible subframe by a UE.

FIG. 2 is a flow diagram illustrating one configuration of a method 200 for dynamically configuring a flexible subframe by a UE 102. The UE 102 may determine 202 that a subframe is a flexible subframe. As described above, a flexible subframe is a subframe that is configured to be used as a downlink subframe and an uplink subframe in different reference UL-DL configurations (when the UE 102 is configured to utilize multiple UL-DL configurations on multiple cells, for example). In some implementations, the UE 102 may determine 202 subframes that have different subframe types between assigned reference UL-DL configurations as flexible subframes. Additionally or alternatively, the UE 102 may determine 202 that a subframe is a flexible subframe based on received information. For example, the UE 102 may receive information from the eNB 158 indicating that a subframe may be a flexible subframe.

The UE 102 may determine 204 whether a downlink is indicated for the flexible subframe. For example, the UE 102 may determine 204 whether a downlink is indicated for the flexible subframe if a PUSCH is not scheduled for the flexible subframe. The UE 102 may determine 204 whether a downlink is indicated for a flexible subframe based on an indication subframe that is previous to the flexible subframe. In one example, the indication subframe may include a PDCCH (or an EPDCCH) that may indicate a PDSCH for the flexible subframe. As used herein, the term "downlink" may refer to one or more of a downlink subframe type, a downlink transmission and a downlink channel (e.g., PDCCH, EPDCCH, etc.).

In implementations where the indication subframe includes a PDCCH with PDSCH scheduling information for the flexible subframe, the flexible frame may not include a PDCCH. In these implementations, an eIMTA capable UE 102 may assume there is no PDCCH (or EPDCCH) in the flexible subframe because the PDSCH scheduling information was included in the indication subframe (e.g., by the PDCCH or EPDCCH). In another example, the eIMTA capable UE 102 may assume there is no PDCCH (or EPDCCH) in the flexible subframe since the PUSCH scheduling is based on the second configuration and no uplink grant may be issued by the PDCCH (or the EPDCCH) in the flexible subframes.

However, in some implementations, in addition to a PDCCH (or EPDCCH) in the indication subframe, a PDCCH (or an EPDCCH) may be present in a flexible subframe for backward compatibility. For example, a PDCCH (or EPDCCH) in the flexible subframe may be used for control information by non-eIMTA capable UEs 102. For eIMTA capable UEs 102, a PDCCH (or EPDCCH) in the flexible subframe may be used to confirm, modify or override the PDSCH scheduling and resource allocation information included in the indication subframe.

Determining 204 whether a downlink is indicated for a flexible subframe may include determining 204 whether a downlink is indicated based on a downlink indication. In this example, the indication subframe may include a downlink indication (or downlink grant) that notifies the UE 102 that a flexible subframe may be used as a downlink subframe. Additionally, the indication subframe (e.g., downlink grant) may not include a PDCCH (or an EPDCCH) that includes PDSCH resource allocation information for the flexible subframe in this implementation.

Using a downlink indication (or downlink grant) may be beneficial as it may reduce the processing power consumption of the UE 102. For example, because the downlink indication may not include resource allocation information, payload may be very small. For example, a downlink indication (or downlink grant) may include a 1-bit indication that a flexible subframe may be used for downlink.

The UE 102 may optionally determine 206 whether a downlink is scheduled. In addition to determining 206 whether a downlink is scheduled, the UE 102 determine a downlink schedule if a downlink is indicated. In some implementations, the UE 102 may determine 206 a downlink schedule by monitoring for an indication subframe that is previous to the flexible subframe. For example, the UE 102 may receive the indication subframe that is previous to the flexible subframe and determine the downlink schedule based on a PDCCH (or EPDCCH) in the indication subframe. The PDCCH (or EPDCCH) may include or indicate the PDSCH schedule. In this example, the subframe may include PDSCH resource allocation information that may be utilized to schedule a downlink in the flexible subframe.

As described above, in some implementations, the UE 102 may optionally determine 206 a downlink schedule based on the flexible subframe. For example, the UE 102 may receive an indication subframe that is previous to the flexible subframe. The indication subframe may include a downlink indication that only notifies the UE 102 that a flexible subframe may be used as a downlink subframe. In this example, the UE 102 may determine the PDSCH schedule based on the PDCCH (or EPDCCH) in the flexible subframe. Accordingly, the UE 102 may monitor the flexible subframe for the PDCCH (or an EPDCCH) that schedules the PDSCH. In some implementations, the downlink indication may use one or more of a specific PDCCH (or EPDCCH) DCI format, a modified PDCCH (or EPDCCH) format, a reserved physical hybrid automatic repeat request indicator channel (PHICH) resource and a dedicated channel resource and signal to notify a UE that a flexible subframe may be used as a downlink subframe.

The UE 102 may set 208 the flexible subframe as a downlink subframe if a downlink is indicated. For example, the UE 102 may identify the flexible subframe as a downlink subframe and may additionally or alternatively anticipate or expect downlink transmissions to occur in the flexible subframe. In some implementations, setting 208 the flexible subframe as a downlink subframe may include monitoring for a PDCCH and/or an EPDCCH for a downlink for the flexible subframe. In some implementations, monitoring for a PDCCH may include receiving a downlink (e.g., PDSCH) in the flexible subframe and decoding a PDSCH in the flexible subframe. As described above, a UE 102 may monitor 208 the flexible subframe for a downlink if a PDSCH has been scheduled. By comparison, the UE 102 may avoid monitoring the flexible subframe for a PDCCH and/or an EPDCCH for a downlink in the flexible subframe if a downlink is not indicated. Additionally or alternatively, the UE 102 may monitor 208 the flexible subframe if a PDSCH is indicated. For example, the UE 102 may monitor 208 the flexible subframe for one or more of a PDCCH and/or an EPDCCH and a PDSCH if a PDSCH is indicated.

In some implementations, monitoring for a PDCCH and/or an EPDCCH may include monitoring for the PDCCH and/or the EPDCCH in a scheduling subframe that is previous to the flexible subframe. The scheduling subframe may be a closest downlink subframe before the flexible subframe.

Setting 208 the flexible subframe as a downlink subframe may be beneficial as it may lead to a reduction in energy cost and as it alleviates the need for continuous monitoring of all flexible subframes for downlink (even if a PDSCH is not scheduled), provides greater flexibility of channel usage and reduces the downlink monitoring of flexible subframes. For example, in current and previous LTE releases, the PDSCH may be scheduled in one subframe (e.g., the same transmission time interval (TTI)). In those approaches, a UE may monitor, receive and try to decode a PDCCH (or an EPDCCH) in the flexible subframe even if there is no PUSCH scheduled in the flexible subframe. Thus, the UE may monitor for a PDSCH and a downlink even if there is no data to be received. This may cause unnecessary data processing and energy cost for the UE.

Figure 3:
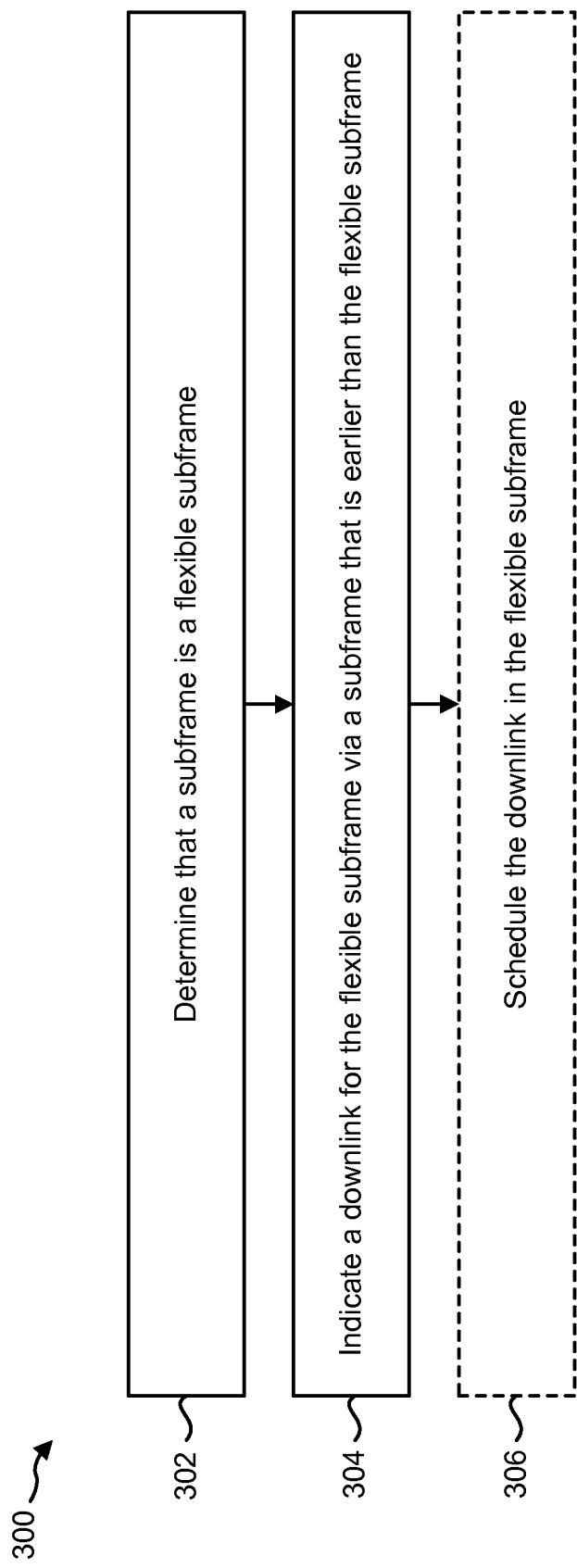
FIG. 3 is a flow diagram illustrating one configuration of a method for dynamically configuring a flexible subframe by an eNB.

FIG. 3 is a flow diagram illustrating one configuration of a method 300 for dynamically configuring a flexible subframe by an eNB 158. The eNB 158 may determine 302 that a subframe is a flexible subframe. As described above, a flexible subframe is a subframe that may be configured to be used as a downlink subframe and an uplink subframe in different reference UL-DL configurations (when the UE 102 is configured to utilize multiple UL-DL configurations on multiple cells, for example). Optionally, the eNB 158 may determine 302 subframes that have different subframe types between assigned reference UL-DL configurations as flexible subframes. In some implementations, the eNB 158 may pass information regarding whether a subframe is a flexible subframe. In one example, the eNB 158 may implicitly indicate one or more flexible subframes to a UE 102 by configuring the UE 102 with a combination of reference UL-DL configurations (e.g., by signaling a combination of reference UL-DL configurations). In another example, the eNB 158 may signal to the UE 102 that a subframe may be a flexible subframe, based on PHY layer signaling, for example.

The eNB 158 may indicate 304 a downlink for the flexible subframe via a subframe (e.g., an indication subframe) that is previous to the flexible subframe. For example, the eNB 158 may indicate 304 the flexible subframe as a downlink subframe. Additionally or alternatively, the eNB 158 may indicate 304 a PDSCH for the flexible subframe. In some implementations, the eNB 158 may indicate 304 a PDSCH for the flexible frame via a PDCCH (or EPDCCH) that is included in an indication subframe that is previous to the flexible subframe. The indication subframe may be a closest downlink subframe before the flexible subframe. The PDCCH (or EPDCCH) may indicate 304 to the UE 102 that a downlink is or will be scheduled in the flexible subframe. In some implementations, the eNB 158 may indicate 304 a downlink for the flexible subframe via an indication subframe that does not include a PDCCH (or an EPDCCH) with PDSCH resource allocation information for the indicated subframe. For example, the indication subframe may include a downlink indication (or downlink grant). The downlink indication may notify the UE 102 that a flexible subframe may be used as a downlink subframe. If a downlink indication is issued for the flexible subframe, the UE 102 may monitor, receive and decode the given flexible subframe as a normal downlink subframe. Accordingly, the PDSCH scheduling and resource allocation may be provided in the PDCCH (or EPDCCH) of the flexible subframe.

In some implementations, the eNB 158 may schedule 306 the downlink for the flexible subframe. For example, the eNB 158 may send the UE 102 a scheduling subframe that includes a PDCCH and/or EPDCCH. The PDCCH (or EPDCCH) may include PDSCH resource allocation information. In some implementations, the eNB 158 may send the PDCCH (or EPDCCH) in the scheduling subframe. When the PDCCH (or EPDCCH) is sent in the scheduling subframe, the PDCCH (or EPDCCH) may schedule 306 the PDSCH in addition to indicating 304 the PDSCH for the flexible subframe. In other words, in some implementations, indicating 304 a PDSCH for the flexible frame and scheduling 306 the PDSCH are performed by a PDCCH (or EPDCCH) in the scheduling subframe.

In other implementations, an indication subframe includes a downlink indication that does not include a PDCCH with PDSCH resource allocation information for the indicated subframe. In these implementations, the eNB 158 may schedule 306 the PDSCH by sending a PDCCH (or EPDCCH) in the flexible subframe. In other words, indicating 304 a PDSCH for the flexible subframe may include sending a downlink indication in the indication subframe and scheduling 306 the PDSCH may be performed by a PDCCH (or EPDCCH) in the flexible subframe.

In some cases, one or more of indicating 304 a PDSCH and scheduling 306 the PDSCH may be based on a PUSCH scheduling timing. For example, the PUSCH scheduling timing (of the second reference UL-DL configuration, for example) may be applied or reused to signal PDSCH scheduling. In some implementations, the eNB 158 may schedule 306 PDSCH transmissions for multiple subframes. In this example, one PDCCH (or EPDCCH) in the indication subframe may be used to schedule the multiple PDSCH transmissions. Scheduling 306 a PDSCH in the flexible subframe may be beneficial as it may lead to a reduction in energy cost and as it alleviates the need to send a PDCCH (or an EPDCCH) in the flexible subframe even if there is no data to transmit, which causes unnecessary data processing and energy cost for the eNB 158.

Figure 4:
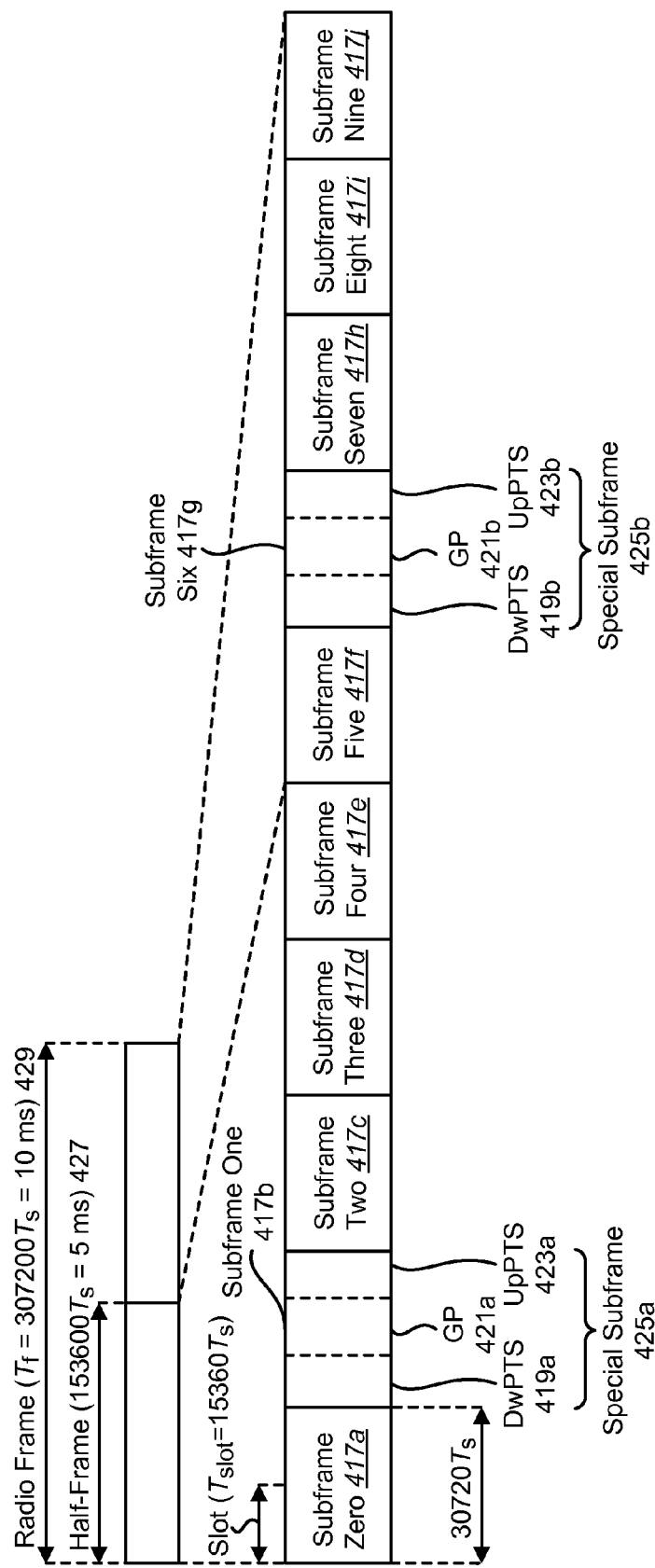
FIG. 4 is a diagram illustrating one example of a radio frame that may be used in accordance with the systems and methods disclosed herein.

FIG. 4 is a diagram illustrating one example of a radio frame 429 that may be used in accordance with the systems and methods disclosed herein. This radio frame 429 structure illustrates a TDD structure. Each radio frame 429 may have a length of $T_f=307200 \cdot T_s=10$ milliseconds (ms), where $T_f$ is a radio frame 429 duration and $T_s$ is a time unit equal to $$\frac{1}{(15000 \times 2048)}$$

seconds. The radio frame 429 may include two half-frames 427, each having a length of $153600 \cdot T_s=5$ ms. Each half-frame 427 may include five subframes 417a-e, 417f-j each having a length of $30720 \cdot T_s=1$ ms. In some implementations, one or more of the subframes 417 may be a flexible subframe or an indication subframe as described herein. As described above, in some implementations, an indication subframe may be a subframe 417 that is located previous to the flexible subframe (e.g., is communicated before the flexible subframe).

TDD UL-DL configurations 0-6 are given below in Table (1) (from Table 4.2-2 in 3GPP TS 36.211). UL-DL configurations with both 5 millisecond (ms) and 10 ms downlink-to-uplink switch-point periodicity may be supported. In particular, seven UL-DL configurations are specified in 3GPP specifications, as shown in Table (1) below. In Table (1), "D" denotes a downlink subframe, "S" denotes a special subframe and "U" denotes a UL subframe.

TABLE (1)

| TDD UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s=1$ ms. In Table (2), "cyclic prefix" is abbreviated as "CP" and "configuration" is abbreviated as "Config" for convenience.

TABLE (2)

| Special Subframe Config | Normal CP in downlink | | | Extended CP in downlink | | |
| --- | --- | --- | --- | --- | --- | --- |
| | DwPTS | UpPTS | | DwPTS | UpPTS | |
| | | Normal CP in uplink | Extended CP in uplink | | Normal CP in uplink | Extended CP in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | 12800·$T_s$ | | |
| 8 | 24144·$T_s$ | | | — | — | — |
| 9 | 13168·$T_s$ | | | — | — | — |

As described above, UL-DL configurations with both 5 ms and 10 ms downlink-to-uplink switch-point periodicity may be supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 417 that may be used include a downlink subframe, an uplink subframe and a special subframe 425. In the example illustrated in FIG. 4, which has a 5 ms periodicity, two standard special subframes 425a-b are included in the radio frame 429.

The first special subframe 425a includes a downlink pilot time slot (DwPTS) 419a, a guard period (GP) 421a and an uplink pilot time slot (UpPTS) 423a. In this example, the first standard special subframe 425a is included in subframe one 417b. The second standard special subframe 425b includes a downlink pilot time slot (DwPTS) 419b, a guard period (GP) 421b and an uplink pilot time slot (UpPTS) 423b. In this example, the second standard special subframe 425b is included in subframe six 417g. The length of the DwPTS 419a-b and UpPTS 423a-b may be given by Table 4.2-1 of 3GPP TS 36.211 (illustrated in Table (2) above) subject to the total length of each set of DwPTS 419, GP 421 and UpPTS 423 being equal to 30720·$T_s$=1 ms.

Each subframe i 417a-j (where i denotes a subframe ranging from subframe zero 417a (e.g., 0) to subframe nine 417j (e.g., 9) in this example) is defined as two slots, 2i and 2i+1 of length $T_{slot}$=15360·Ts=0.5 ms in each subframe 417. For example, subframe zero (e.g., 0) 621a may include two slots, including a first slot.

FIG. 4 illustrates one example of a radio frame 429 with 5 ms switch-point periodicity. In the case of 5 ms downlink-to-uplink switch-point periodicity, each half-frame 427 includes a standard special subframe 425a-b. In the case of 10 ms downlink-to-uplink switch-point periodicity, a special subframe may exist in the first half-frame 631 only.

Subframe zero (e.g., 0) 417a and subframe five (e.g., 5) 417f and DwPTS 419a-b may be reserved for downlink transmission. The UpPTS 423a-b and the subframe(s) immediately following the special subframe(s) 425a-b (e.g., subframe two 417c and subframe seven 417h) may be reserved for uplink transmission.

Figure 5:
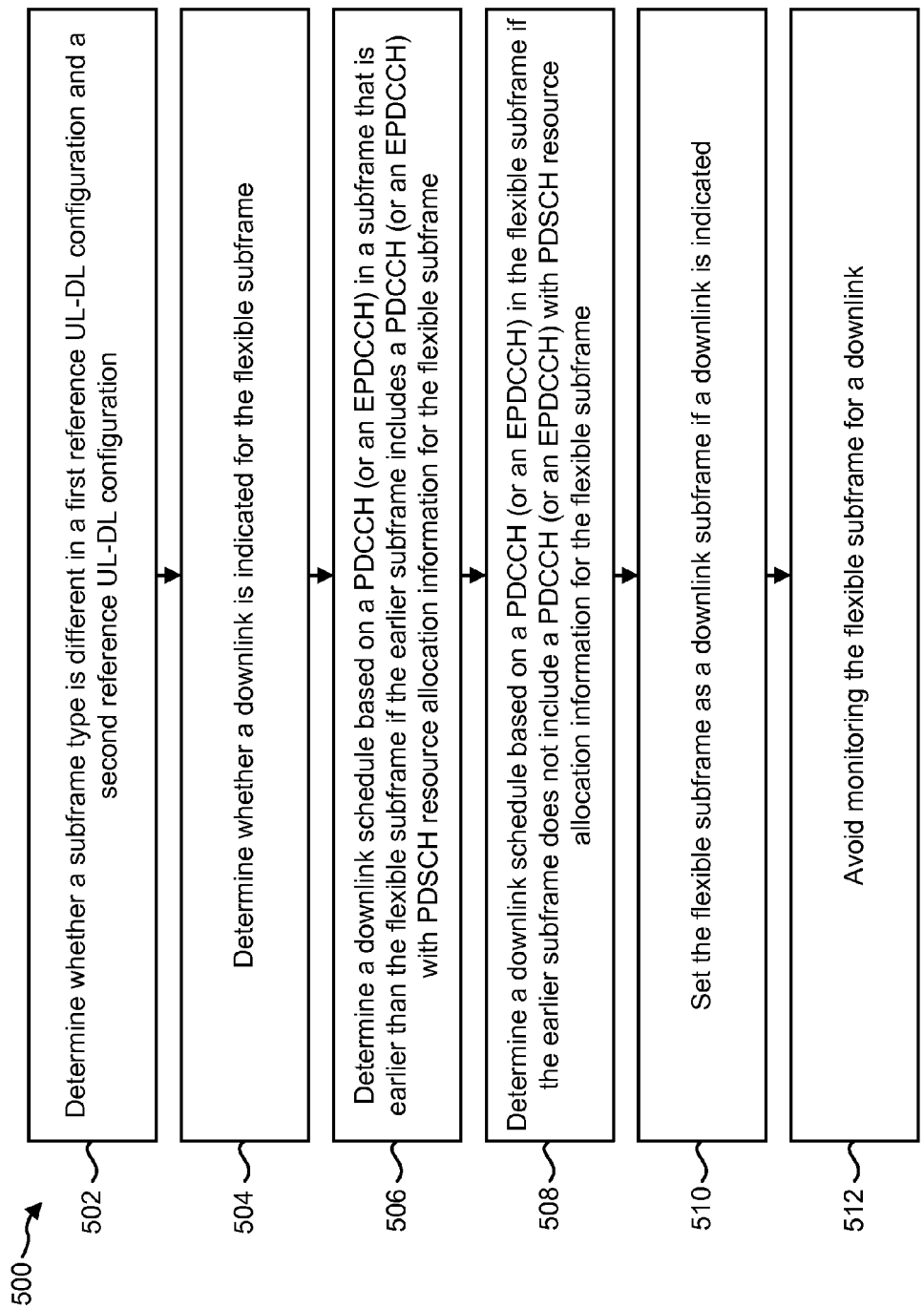
FIG. 5 is a flow diagram illustrating a more specific configuration of a method for dynamically configuring a flexible subframe by a UE.

FIG. 5 is a flow diagram illustrating a more specific configuration of a method 500 for dynamically configuring a flexible subframe by a UE 102. As described above, the UE may determine that a subframe is a flexible subframe. In some implementations, the UE 102 may optionally determine 502 whether a subframe type is different in a first reference UL-DL configuration and a second reference UL-DL configuration. As described earlier, if a subframe is of a different type under the first reference UL-DL configuration and the second reference UL-DL configuration, then the frame may be a flexible subframe. In some implementations, the UE 102 may utilize a look-up table or logic to determine 502 whether a subframe type is different between reference UL-DL configurations. For example, a particular combination of reference UL-DL configurations may indicate whether certain subframes are flexible subframes or not, based on whether a subframe has different types (e.g., uplink and downlink) in the combination of reference UL-DL configurations.

The UE 102 may determine 504 whether a downlink is indicated for the flexible subframe. In some implementations, this may be done as described in connection with FIG. 2.

According to some implementations, the indication subframe may indicate a downlink by indicating the distance between the indication subframe and the flexible subframe. According to one approach, the indication subframe may be a number of subframes before the flexible subframe based on a pre-defined cross-TTI PDSCH association timing. For example, the association timing may be based on the combination of a downlink reference TDD UL-DL configuration (e.g., the first reference UL-DL configuration) and an uplink reference TDD UL-DL configuration (e.g., the second reference UL-DL configuration). The PUSCH scheduling timing (of the uplink reference or second reference UL-DL configuration, for example) may be reused to signal PDSCH scheduling. In other words, the PUSCH scheduling timing of the second reference UL-DL configuration can be reused to do PDSCH scheduling.

In some implementations, to differentiate between PDSCH scheduling for a flexible subframe following the PUSCH scheduling timing and regular PDSCH scheduling in the same TTI, an indication may be added to a PDSCH scheduling DCI format. For example, a 1-bit indicator may indicate a PDSCH scheduling following a PUSCH scheduling. In another example, the association timing may be based on a default UL-DL configuration. For example, the PUSCH scheduling timing of the default TDD UL-DL configuration may be reused to signal PDSCH scheduling. In some implementations, a default UL-DL configuration may be an UL-DL configuration specified by an eNB for all UEs.

According to another approach, the indication subframe (e.g., the cross-TTI PDSCH scheduling subframe) may be the closest fixed downlink subframe before the flexible subframe. If there are multiple flexible subframes behind a fixed downlink subframe, one or more bits (e.g. 2 bits) may be added to the DCI of the indication subframe to indicate the index value of the flexible subframe.

In yet another approach, the indication subframe (e.g., the cross-TTI PDSCH scheduling subframe) may be offset from the flexible subframe by a certain subframe offset value k. The subframe offset value k may indicate the number of subframes between the indication subframe and the flexible subframe. In some implementations, one or more bits (e.g. 2 bits) may be added to the DCI of the earlier subframe to indicate the subframe offset value k.

In some implementations, the UE 102 may determine 506 a downlink (e.g., a PDSCH) schedule based on a PDCCH (or EPDCCH) in a subframe (e.g., indication subframe) that is earlier than the flexible subframe if the indication subframe includes a PDCCH (or EPDCCH) with PDSCH resource allocation information for the flexible subframe. As described above, in some implementations the indication subframe may include a PDCCH (or EPDCCH) that indicates a PDSCH for the flexible subframe. In this implementation, determining 506 a downlink schedule may include receiving the indication subframe and determining the downlink schedule via the PDCCH (or EPDCCH) included in the indication subframe.

Alternatively, the UE 102 may determine 508 a downlink schedule for the flexible subframe based on a PDCCH (or EPDCCH) in the flexible subframe if the earlier subframe does not include a PDCCH (or EPDCCH) with PDSCH resource allocation information for the flexible subframe. For example, the UE 102 may receive an indication subframe that includes a downlink indication that notifies the UE 102 that a flexible subframe may be used as a downlink subframe. In this example, the indication subframe may not include a PDCCH (or EPDCCH) with PDSCH resource allocation information for the flexible subframe. Accordingly, determining a downlink schedule may include receiving the indication subframe that includes a downlink indicator that indicates a PDSCH in the flexible subframe and monitoring the flexible subframe for a PDCCH (or an EPDCCH) that schedules a PDSCH for the flexible subframe.

The UE 102 may set 510 the flexible subframe as a downlink subframe if a downlink is indicated. In some implementations, this may be done as described in connection with FIG. 2.

If a downlink is not indicated, the UE 102 may avoid 512 monitoring the flexible subframe for a downlink (e.g., PDSCH). Avoiding 512 monitoring the flexible subframe may be beneficial in that it allows the UE 102 to conserve power by monitoring a flexible subframe for a downlink only when a PDSCH has been indicated instead of continuously monitoring the flexible subframe. In some implementations, if a PDSCH is indicated in the indication subframe that does not include a PDCCH (or an EPDCCH) with PDSCH resource allocation information for the flexible subframe, the UE 102 may monitor the flexible subframe for the PDCCH and/or EPDCCH and may monitor the flexible subframe for the PDSCH if directed (e.g., targeted) to the UE 102.

Figure 6:
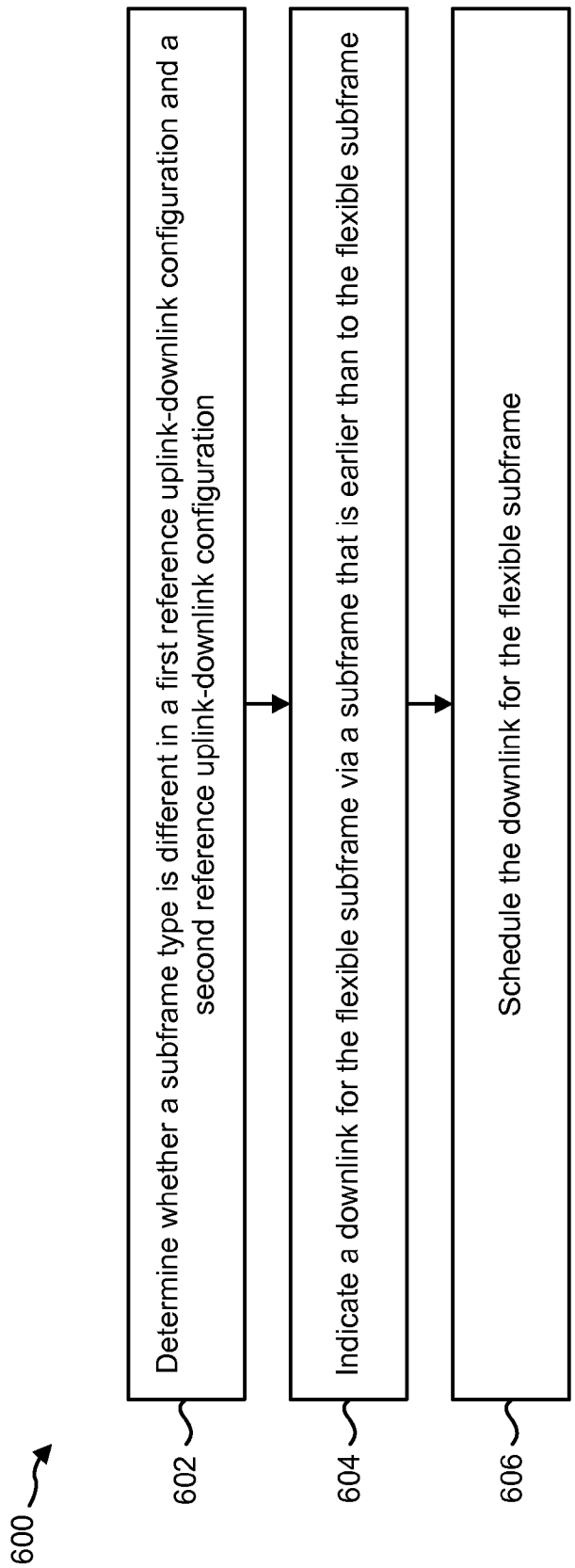
FIG. 6 is a flow diagram illustrating a more specific configuration of a method for dynamically configuring a flexible subframe by an eNB.

FIG. 6 is a flow diagram illustrating a more specific configuration of a method 600 for dynamically configuring a flexible subframe by an eNB 158. As described in connection with FIG. 3, the eNB 158 may determine that a subframe is a flexible subframe. In some implementations, the eNB 158 optionally may determine 602 whether a subframe type is different in a first reference UL-DL configuration and a second reference UL-DL configuration. As described earlier, if a subframe has a different configuration under the first reference UL-DL configuration and the second reference UL-DL configuration, then the frame may be a flexible subframe.

The eNB 158 may indicate 604 a downlink for the flexible subframe via a subframe that is previous to the flexible subframe. In some implementations, this may be done as described in connection with FIG. 3.

In some implementations, the indication subframe may indicate a downlink by indicating the distance between the indication subframe and the flexible subframe. According to one approach, the indication subframe may be a number of subframes before the flexible subframe based on a pre-defined cross-TTI PDSCH association timing. For example, the association timing may be based on the combination of a downlink reference TDD UL-DL configuration (e.g., the first reference UL-DL configuration) and an uplink reference TDD UL-DL configuration (e.g., the second reference UL-DL configuration). The PUSCH scheduling timing (of the uplink reference or second reference UL-DL configuration, for example) may be reused to signal PDSCH scheduling.

In some implementations, to differentiate between PDSCH scheduling for a flexible subframe following the PUSCH scheduling timing and regular PDSCH scheduling in the same TTI, an indication may be added to a PDSCH scheduling DCI format. For example, a 1-bit indicator may indicate a PDSCH scheduling following a PUSCH scheduling. In another example, the association timing may be based on a default UL-DL configuration. For example, the PUSCH scheduling timing of the default TDD UL-DL configuration may be reused to signal PDSCH scheduling.

According to another approach, the indication subframe (e.g., the cross-TTI PDSCH scheduling subframe) may be the closest downlink subframe before the flexible subframe. If there are multiple flexible subframes behind a fixed downlink subframe, one or more bits (e.g. 2 bits) may be added to the DCI of the indication subframe to indicate the index value of the flexible subframe.

In yet another approach, the indication subframe (e.g., the cross-TTI PDSCH scheduling subframe) may be offset from the flexible subframe by a certain subframe offset value k. The subframe offset value k may indicate the number of subframes between the indication subframe and the flexible subframe. In some implementations, one or more bits (e.g. 2 bits) may be added to the DCI of the indication subframe to indicate the subframe offset value k.

In some implementations, indicating 604 a PDSCH may include sending a subframe offset value that indicates the number of subframes between the indication subframe and the flexible subframe. As described above, in some implementations, indicating a PDSCH in the flexible subframe may include indicating the distance between the indication subframe and the flexible subframe. For example, the eNB 158 may send a subframe offset value k that indicates the number of subframes between the indication subframe and the flexible subframe n. According to this example, the indication subframe would be at a position n–k.

Optionally, the eNB 158 may schedule 606 a downlink for the flexible subframe. In some implementations, this may be done as described in connection with FIG. 3.

FIG. 7 is a diagram illustrating one example of uplink and downlink (UL-DL) configurations that may be utilized in accordance with the systems and methods disclosed herein. In FIG. 7, some numerals have been spelled out in text for convenience. For example, UL-DL configuration 2 is labeled as "UL-DL Configuration Two 739, UL-DL configuration 1 is labeled as "UL-DL Configuration One 741" and UL-DL configuration 0 is labeled as "UL-DL Configuration Zero 743." In FIG. 7, UL-DL configuration two 739 is a first (e.g., downlink) reference UL-DL configuration. Furthermore, UL-DL configuration zero 743 is a second (e.g., uplink) reference UL-DL configuration. Furthermore, UL-DL configuration one 741 (e.g., "1") is a default configuration.

It should be noted that subframes 719 marked with a "D" denote DL subframes 733, those marked with a "U" denote UL subframes 735 and those marked with an "S" denote standard special subframes 725. Furthermore, downlink scheduling for PUSCH transmission associations 749 is illustrated. In some implementations, the spacing between the indication subframe and the flexible subframe may be based on the PUSCH transmission associations 749.

In this example, an allowed dynamic UL-DL reconfiguration set includes UL-DL configuration two 739 (e.g., "2"), UL-DL configuration one 741 (e.g., "1") and UL-DL configuration zero 743 (e.g., "0"). Based on the allowed dynamic UL-DL reconfiguration set, the UE 102 and the eNB 158 know the first reference UL-DL configuration for PDSCH HARQ-ACK as UL-DL configuration two 739 and the second reference UL-DL configuration for PUSCH scheduling and PUSCH HARQ-ACK as configuration zero 743. Thus, this example illustrates different reference UL-DL configurations for dynamic TDD UL-DL reconfiguration.

FIG. 7 illustrates UL-DL configuration two 739 (e.g., "UL-DL configuration 2") with subframes 719a and subframe numbers 737a. FIG. 7 also illustrates UL-DL configuration one 741 with subframes 719b and subframe numbers 737b. FIG. 7 further illustrates UL-DL configuration zero 743 with subframes 719c and subframe numbers 737c.

In this example, the second reference UL-DL configuration (e.g., uplink reference UL-DL configuration) may be UL-DL configuration zero 743. Accordingly, a UE 102 may apply or reuse the downlink scheduling for PUSCH transmission associations 749 corresponding to UL-DL configuration zero 743 to determine a PDSCH schedule in some implementations as described above. Alternatively, the UE 102 may apply or reuse the downlink scheduling for PUSCH transmission associations 749 corresponding to UL-DL configuration one 741 (e.g., the default UL-DL configuration) to determine a PDSCH schedule in some implementations as described above.

In accordance with the procedures described above, determining that a subframe is a flexible subframe may be based on a first reference UL-DL configuration (UL-DL configuration two 739) and a second reference UL-DL configuration (UL-DL configuration zero 743). For example, as illustrated in FIG. 7, flexible regions 747 may include flexible subframes 3-4 and 8-9. The subframes 3-4 and 8-9 are flexible subframes because they are different between the first reference UL-DL configuration (UL-DL configuration two 739) and the second reference UL-DL configuration (UL-DL configuration zero 743) (e.g., in UL-DL configuration two 739 the subframes are downlink subframes as indicated by the letter "D" and in UL-DL configuration zero 743 the subframes are uplink subframes as indicated by the letter "U").

Figure 8:
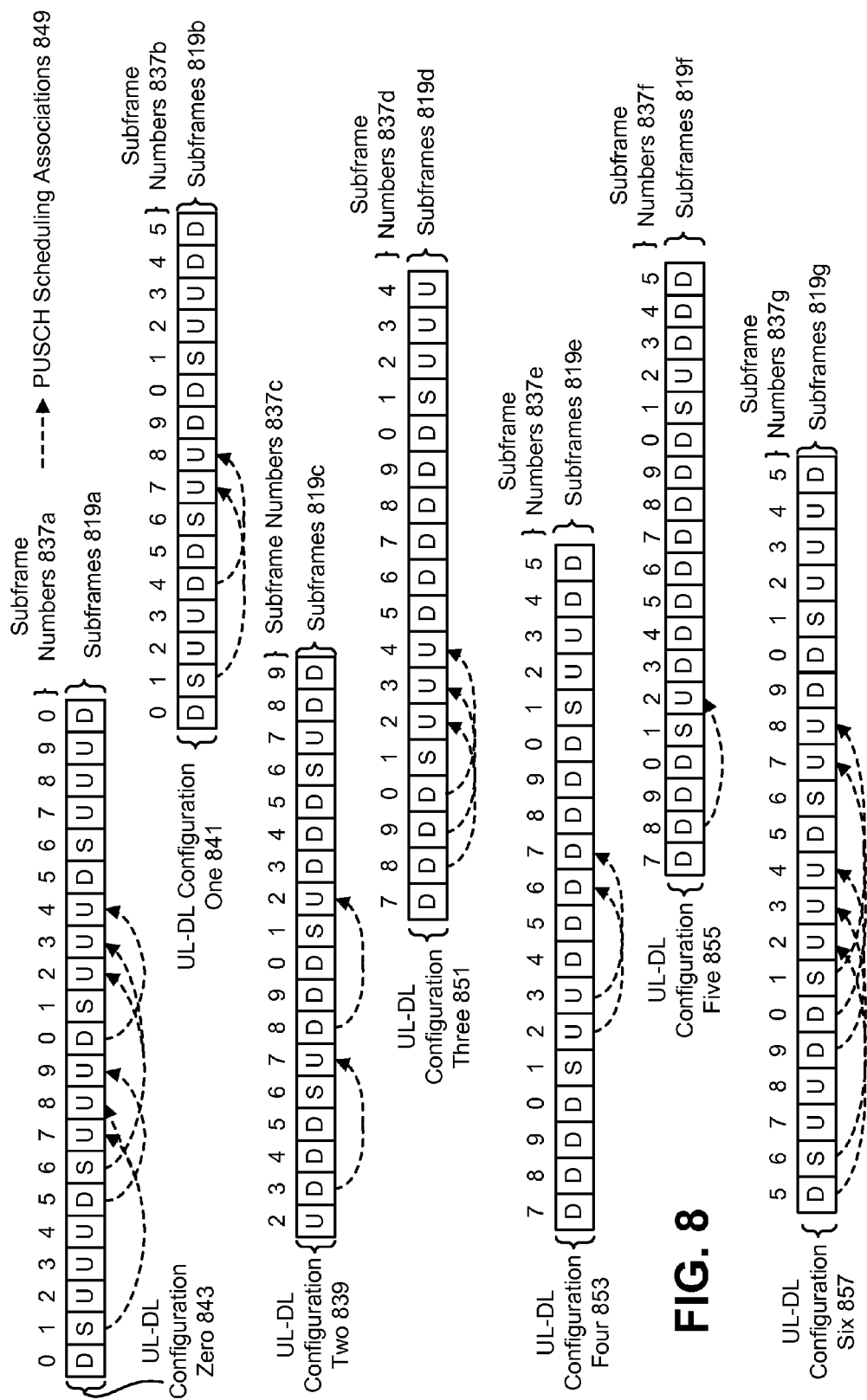

FIG. 8 is a diagram illustrating some UL-DL configurations 839, 841, 843, 851, 853, 855 and 857 that the systems and methods disclosed herein may be applied to. In particular, FIG. 8 illustrates UL-DL configuration zero 843 (e.g., "UL-DL configuration 0") with subframes 819a and subframe numbers 837a, UL-DL configuration one 841 (e.g., "UL-DL configuration 1") with subframes 819b and subframe numbers 837b, UL-DL configuration two 839 (e.g., "UL-DL configuration 2") with subframes 819c and subframe numbers 837c and UL-DL configuration three 851 (e.g., "UL-DL configuration 3") with subframes 819d and subframe numbers 837d. FIG. 8 also illustrates UL-DL configuration four 853 (e.g., "UL-DL configuration 4") with subframes 819e and subframe numbers 837e, UL-DL configuration five 855 (e.g., "UL-DL configuration 5") with subframes 819f and subframe numbers 837f and UL-DL configuration six 857 (e.g., "UL-DL configuration 6") with subframes 819g and subframe numbers 837g.

FIG. 8 further illustrates PUSCH scheduling associations 849 (e.g., downlink scheduling for PUSCH transmission associations) corresponding to each UL-DL configuration. It should be noted that some of the radio frames illustrated in FIG. 8 have been truncated for convenience.

Figure 9:
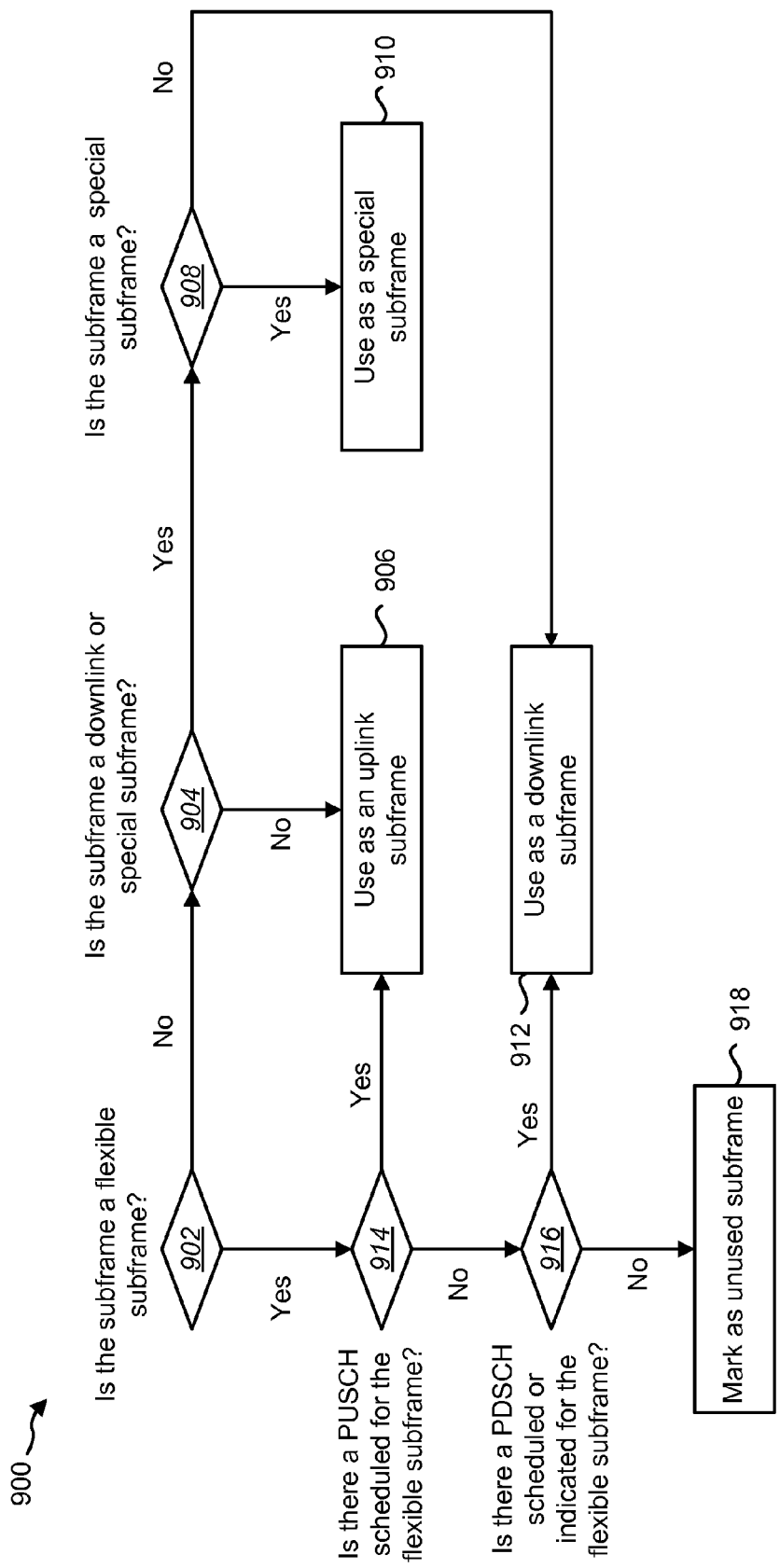
FIG. 9 is a flow diagram illustrating another more specific configuration of a method for dynamically configuring a flexible subframe by a UE.

FIG. 9 is a flow diagram illustrating another more specific configuration of a method 900 for dynamically configuring a flexible subframe by a UE 102. In some implementations, a network may be configured with a large number of flexible subframes, so that the UE 102 may have increased energy savings by monitoring only the fixed downlink subframes and the flexible subframes that have a PDSCH scheduled for downlinks.

In some implementations, the UE 102 may determine 902 whether a subframe is a flexible subframe. For example, the UE may determine 902 that a subframe is a flexible subframe based on the first reference UL-DL configuration and the second reference UL-DL configuration as described above. If the UE 102 determines 902 that the subframe is not a flexible subframe, the UE 102 may use the subframe as the one or more of a downlink subframe, a special subframe or an uplink subframe, based on the configuration. In this case, the UE 102 may determine 904 whether the subframe is a downlink subframe or a special subframe. If the UE 102 determines 904 that the subframe is not a downlink subframe or a special subframe, the UE 102 may use 906 the subframe as an uplink subframe. If the UE 102 determines 904 that the subframe is a downlink subframe or a special subframe, the UE 102 may then determine 908 if the subframe is a special subframe. If the UE 102 determines 908 that the subframe is a special subframe, the UE 102 may use 910 the subframe as a special subframe. If the UE 102 determines 908 that the subframe is not a special subframe, the UE 102 may use 912 the subframe as a downlink subframe.

If the UE 102 determines 902 that the subframe is a flexible subframe, the UE 102 may determine 914 if there is a PUSCH scheduled for the flexible subframe. The UE 102 may determine 914 if a PUSCH is scheduled by determining whether an uplink grant (e.g., PUSCH scheduling DCI 0/4) is issued to the UE 102 in a previous downlink subframe with the uplink grant timing. If the UE 102 determines 914 that a PUSCH is scheduled, the UE 102 may use 906 the flexible subframe as an uplink subframe. Accordingly, the UE 102 may transmit the PUSCH based on the scheduling information.

If the UE 102 determines 914 that a PUSCH is not scheduled for the flexible subframe, the UE 102 may determine 916 if a PDSCH is scheduled for the flexible subframe. Additionally or alternatively, the UE 102 may determine 916 if a PDSCH is indicated. The PDSCH may be indicated and/or scheduled for a flexible subframe in accordance with one or more of the methods and systems disclosed herein (e.g., methods 200, 300, 500 and 600). If the UE 102 determines 916 that a PDSCH is one or more of indicated or scheduled (e.g., by an indication subframe with a PDCCH (or EPDCCH) or a downlink indication (or downlink grant)), the UE 102 may use 912 the flexible subframe as a downlink subframe. Using 912 the flexible subframe as a downlink subframe may include monitoring and receiving a downlink and decoding the PDSCH in the flexible subframe if a PDSCH scheduled for the UE.

If the UE 102 determines 916 that there is no PDSCH scheduled for the flexible subframe, the UE 102 may mark 918 the flexible subframe as an unused (or muted) subframe. Additionally or alternatively, if the UE 102 determines 916 that there is no PDSCH indicated for the flexible subframe, the UE 102 may mark 918 the flexible subframe as an unused (or muted) subframe. In this example, the UE 102 may not be required to monitor the flexible subframe. For example, the UE 102 may not monitor the unused (or muted) subframe for a PDCCH and (or an EPDCCH) of an unused subframe. Accordingly, the UE 102 may neither transmit nor receive information in the flexible subframe.

In some implementations (e.g., for UE 102 special PDSCH scheduling), only a targeted UE 102 needs to monitor and receive the downlink in the flexible subframe. Other UEs 102 (e.g., not targeted UEs 102) may treat the flexible subframe as a muted subframe.

It should be noted that, if an eIMTA capable cell follows a typical TDD UL-DL configuration, one or more of the methods 200, 300, 500, 600 and 900 described herein may be extended to convert an uplink subframe into a downlink subframe. For example, if a default UL-DL configuration is presented, the default direction of a flexible subframe may be downlink or uplink. With eIMTA, the cross-TTI and/or multi-TTI PDSCH scheduling may be applied to a flexible subframe even if the subframe is an uplink subframe in the default configuration. Accordingly, the cross-TTI and/or multi-TTI PDSCH scheduling may also convert an uplink subframe to a downlink subframe with eIMTA. Therefore, for better energy savings, an eIMTA capable cell can be configured with larger uplink allocations, and may allow dynamic uplink-to-downlink conversion for traffic adaptation using the methods disclosed herein.

Figure 10:
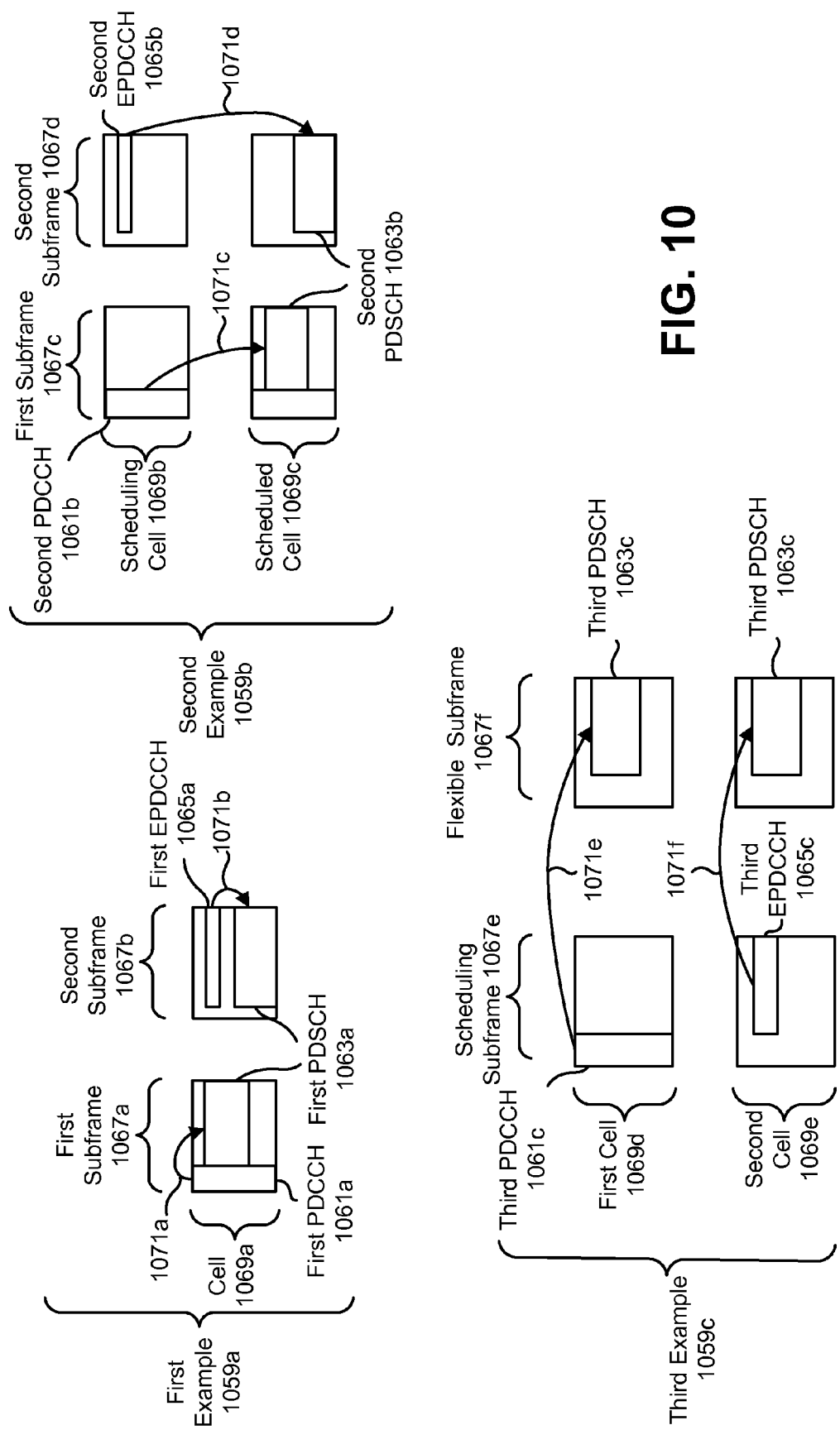
FIG. 10 illustrates some examples of subframes that may be used for one or more of indicating and scheduling a physical downlink shared channel (PDSCH)

FIG. 10 illustrates some examples 1059 of subframes 1067 for one or more of indicating and scheduling a PDSCH 1063. The first example 1059a depicts two implementations where a first PDCCH 1061a or a first EPDCCH 1065a schedules a first PDSCH 1063a in the same subframe 1067. For example, in LTE release 11 (Rel-11) and previous releases, the PDSCH scheduling may be signaled by a PDCCH 1061a or by an EPDCCH 1065a in the same subframe 1067a-b or TTI.

In a first implementation, the first subframe 1067a may be included in a cell 1069a. In this implementation, the first PDCCH 1061a may schedule the first PDSCH 1063a in the first subframe 1067a as depicted by the arrow 1071a. In a second implementation, the first EPDCCH 1065a in a second subframe 1067b may schedule the first PDSCH 1063a in the second subframe 1067b as depicted by the arrow 1071b. In these implementations, the PDSCH scheduling is signaled by the first PDCCH 1061a and the first EPDCCH 1065a that may use one or more of DCI formats 1/1A/1B/1C/1D/2/2A/2B/2C/2D.

In some implementations, a second PDSCH 1063b on a secondary cell (e.g., an SCell) may be cross-carrier scheduled by a second PDCCH 1061b or a second EPDCCH 1065b from another cell, (e.g., a scheduling cell 1069b). The second example 1059b illustrates two implementations of cross-carrier scheduling. In a first implementation, the second PDCCH 1061b in a first subframe 1067c of the scheduling cell 1069b may schedule the second PDSCH 1063b of the first subframe 1067c of a scheduled cell 1069c as depicted by the arrow 1071c. In a second implementation, the second EPDCCH 1065b of a second subframe 1067d of the scheduling cell 1069b may schedule the second PDSCH 1063b of the second subframe 1067c of the scheduled cell 1069c as indicated by the arrow 1071d. In these implementations, the second PDCCH 1061b and the second EPDCCH 1065b may use one or more of DCI formats 1/1A/1B/1C/1D/2/2A/2B/2C/2D.

As depicted in the first example 1059a and the second example 1059b, the PDSCH 1063a-b may be scheduled in the same subframe 1067a-d (e.g., the same transition time interval (TTI)) as a downlink. In these examples, the UE 102 may have to monitor, receive and try to decode a PDCCH 1061a-b (or EPDCCH 1065a-b) in a flexible subframe if there is no PUSCH scheduled for the given UE 102 in the flexible subframe. Moreover, if there is no PUSCH transmission scheduled in a flexible subframe, the eNB 158 may need to transmit a PDCCH 1061a-b (or an EPDCCH 1065a-b) even if there is no data to be transmitted. This may cause unnecessary data processing and energy cost for both the eNB 158 and UEs 102.

In some implementations, a PDCCH or an EPDCCH may schedule a PDSCH in another, and distinct subframe. For example, in some implementations (e.g., cross-TTI PDSCH scheduling), PDSCH transmission and resource allocation for a downlink subframe n (e.g., the flexible subframe), may be scheduled by a PDCCH or an EPDCCH of a previous subframe, n-k (e.g., the scheduling subframe). In the third example 1059c, a third PDSCH 1063c for a flexible subframe 1067f may be scheduled by a third PDCCH 1061c (or a third EPDCCH 1065c) of a previous subframe (e.g., the scheduling subframe 1067e). In some implementations, the scheduling subframe 1067e may be an indication subframe (e.g., that indicates a PDSCH for the flexible subframe) that includes a PDCCH that schedules the PDSCH. The third example 1059c depicts two implementations of cross-TTI scheduling. In the first implementation, the third PDCCH 1061c in a scheduling subframe 1067e of a first cell 1069d may schedule the third PDSCH 1063c of a first cell 1069d of the flexible subframe 1067f as depicted by the arrow 1071e. In the second implementation, the third EPDCCH 1065c in the scheduling subframe 1067e of a second cell 1069e may schedule the third PDSCH 1063c of the second cell 1069e of the flexible subframe 1067f as depicted by the arrow 1071f.

Cross-TTI PDSCH scheduling in this fashion may be beneficial as it alleviates the need for a UE 102 to monitor and try to decode a PDCCH in the flexible subframe if none has been scheduled by a previous subframe. Similarly, the eNB 158 may not need to transmit a PDCCH in the flexible subframe if none has been scheduled in the scheduling subframe. Accordingly, data processing and energy are conserved as a UE 102 only needs to monitor a flexible subframe for a downlink if one has been scheduled, and the eNB 158 only needs to transmit a PDCCH in the special subframe if one has been scheduled.

Figure 11:
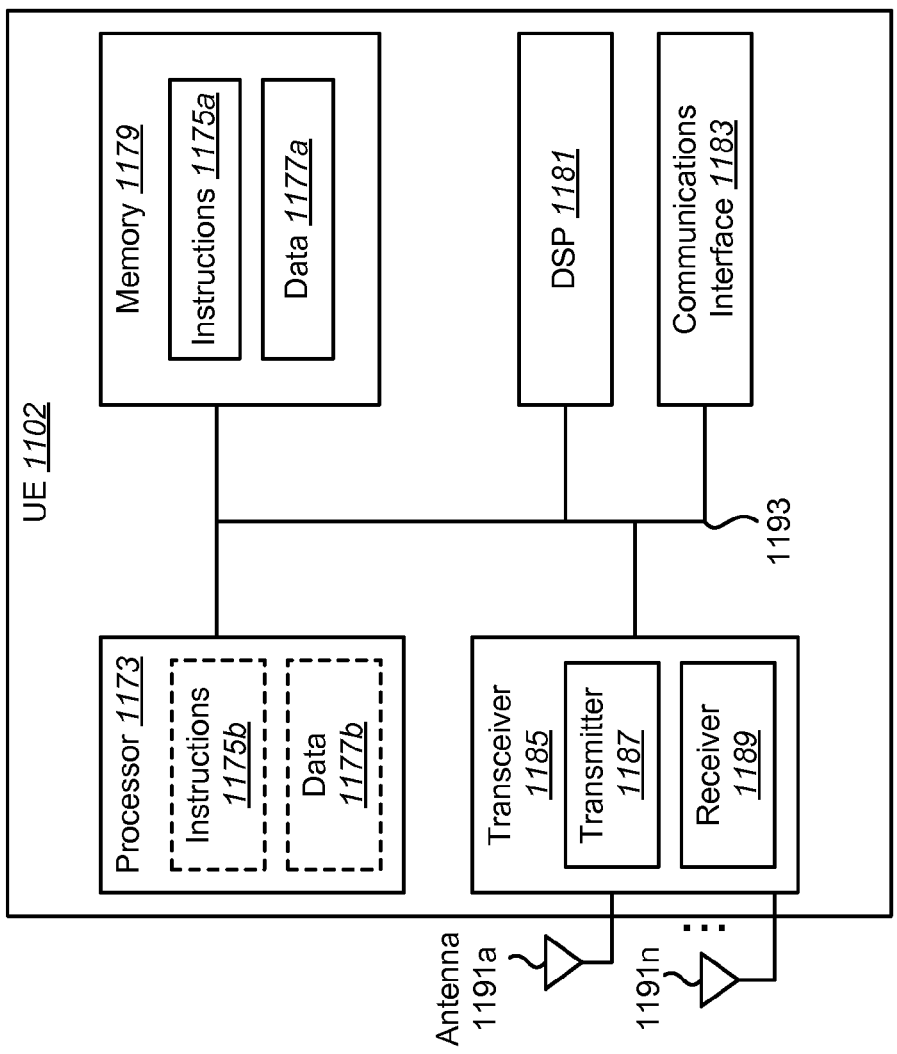
FIG. 11 illustrates various components that may be utilized in a UE.

FIG. 11 illustrates various components that may be utilized in a UE 1102. The UE 1102 described in connection with FIG. 11 may be implemented in accordance with the UE 102 described in connection with FIG. 1. The UE 1102 includes a processor 1173 that controls operation of the UE 1102. The processor 1173 may also be referred to as a central processing unit (CPU). Memory 1179, which may include read-only memory (ROM), random access memory (RAM), a combination of the two or any type of device that may store information, provides instructions 1175a and data 1177a to the processor 1173. A portion of the memory 1179 may also include non-volatile random access memory (NVRAM). Instructions 1175b and data 1177b may also reside in the processor 1173. Instructions 1175b and/or data 1177b loaded into the processor 1173 may also include instructions 1175a and/or data 1177a from memory 1179 that were loaded for execution or processing by the processor 1173. The instructions 1175b may be executed by the processor 1173 to implement one or more of the methods 200, 500 and 900 described above.

The UE 1102 may also include a housing that contains one or more transmitters 1187 and one or more receivers 1189 to allow transmission and reception of data. The transmitter(s) 1187 and receiver(s) 1189 may be combined into one or more transceivers 1185. One or more antennas 1191a-n are attached to the housing and electrically coupled to the transceiver 1185.

The various components of the UE 1102 are coupled together by a bus system 1193, which may include a power bus, a control signal bus and a status signal bus, in addition to a data bus. However, for the sake of clarity, the various buses are illustrated in FIG. 11 as the bus system 1193. The UE 1102 may also include a digital signal processor (DSP) 1181 for use in processing signals. The UE 1102 may also include a communications interface 1183 that provides user access to the functions of the UE 1102. The UE 1102 illustrated in FIG. 11 is a functional block diagram rather than a listing of specific components.

Figure 12:
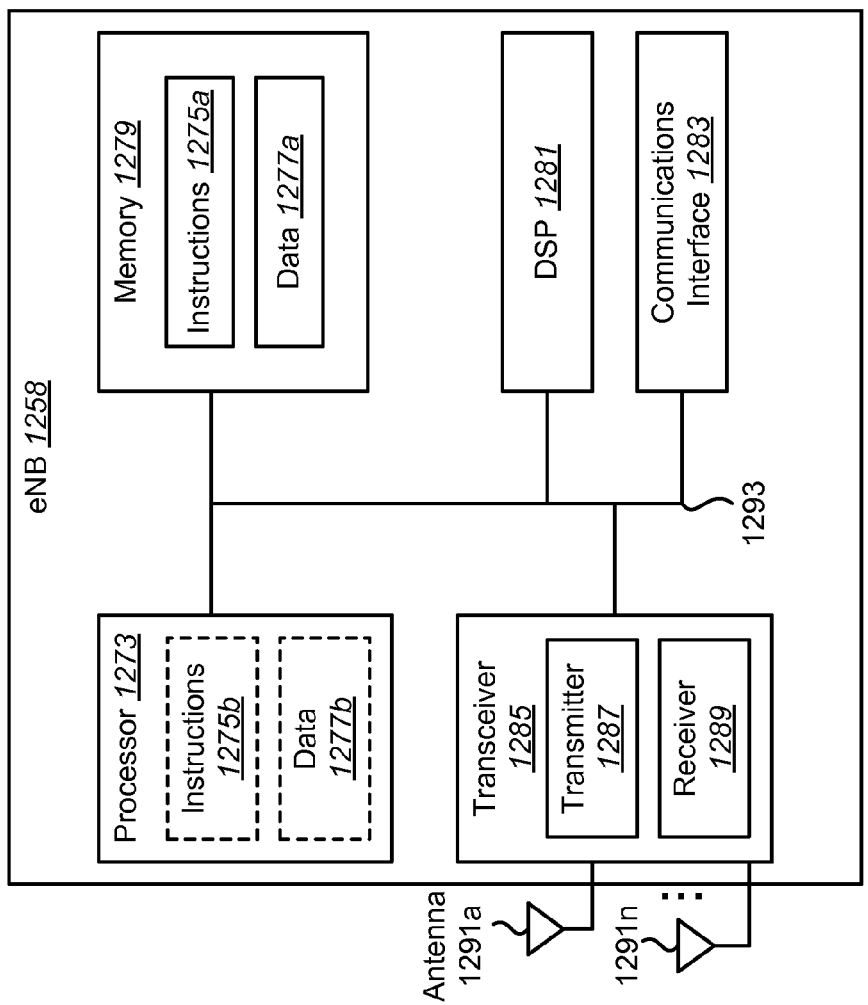
FIG. 12 illustrates various components that may be utilized in an eNB.

FIG. 12 illustrates various components that may be utilized in an eNB 1258. The eNB 1258 described in connection with FIG. 12 may be implemented in accordance with the eNB 158 described in connection with FIG. 1. The eNB 1258 includes a processor 1273 that controls operation of the eNB 1258. The processor 1273 may also be referred to as a central processing unit (CPU). Memory 1279, which may include read-only memory (ROM), random access memory (RAM), a combination of the two or any type of device that may store information, provides instructions 1275a and data 1277a to the processor 1273. A portion of the memory 1279 may also include non-volatile random access memory (NVRAM). Instructions 1275b and data 1277b may also reside in the processor 1273. Instructions 1275b and/or data 1277b loaded into the processor 1273 may also include instructions 1275a and/or data 1277a from memory 1279 that were loaded for execution or processing by the processor 1273. The instructions 1275b may be executed by the processor 1273 to implement one or more of the methods 300 and 600 described above.

The eNB 1258 may also include a housing that contains one or more transmitters 1287 and one or more receivers 1289 to allow transmission and reception of data. The transmitter(s) 1287 and receiver(s) 1289 may be combined into one or more transceivers 1285. One or more antennas 1291a-n are attached to the housing and electrically coupled to the transceiver 1285.

The various components of the eNB 1258 are coupled together by a bus system 1293, which may include a power bus, a control signal bus and a status signal bus, in addition to a data bus. However, for the sake of clarity, the various buses are illustrated in FIG. 12 as the bus system 1293. The eNB 1258 may also include a digital signal processor (DSP) 1281 for use in processing signals. The eNB 1258 may also include a communications interface 1283 that provides user access to the functions of the eNB 1258. The eNB 1258 illustrated in FIG. 12 is a functional block diagram rather than a listing of specific components.

Figure 13:
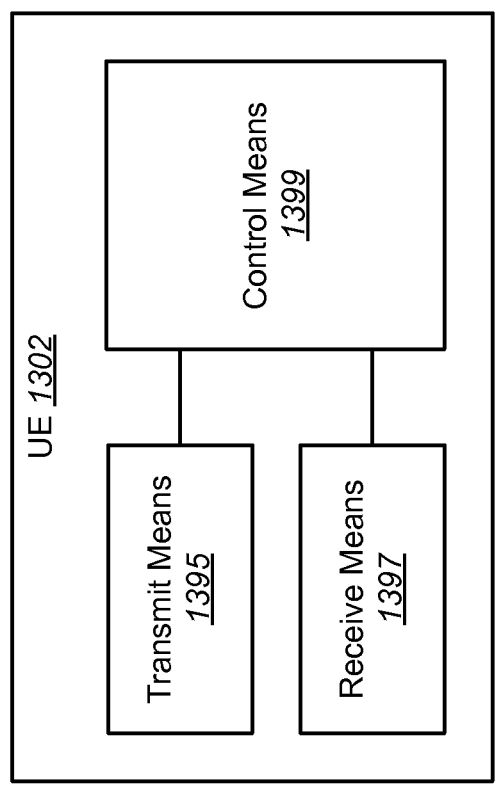
FIG. 13 is a block diagram illustrating one configuration of a UE in which systems and methods for special subframe configuration for carrier aggregation may be implemented.

FIG. 13 is a block diagram illustrating one configuration of a UE 1302 in which systems and methods for dynamically configuring a flexible subframe may be implemented. The UE 1302 includes transmit means 1395, receive means 1397 and control means 1399. The transmit means 1395, receive means 1397 and control means 1399 may be configured to perform one or more of the functions described in connection with FIG. 2, FIG. 5, FIG. 9 and FIG. 12. FIG. 12 above illustrates one example of a concrete apparatus structure of FIG. 13. Other various structures may be implemented to realize one or more of the functions of FIG. 2, FIG. 5, FIG. 9 and FIG. 12. For example, a DSP may be realized by software.

Figure 14:
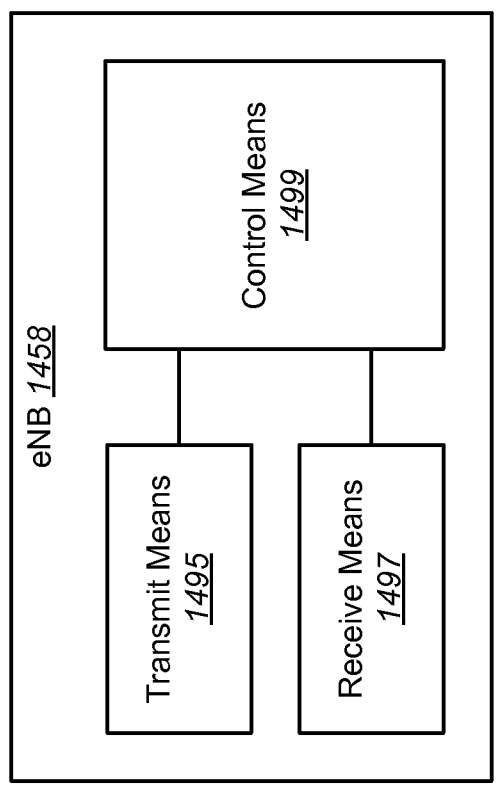
FIG. 14 is a block diagram illustrating one configuration of an eNB in which systems and methods for special subframe configuration for carrier aggregation may be implemented.

FIG. 14 is a block diagram illustrating one configuration of an eNB 1458 in which systems and methods for dynamically configuring a flexible subframe may be implemented. The eNB 1458 includes transmit means 1495, receive means 1497 and control means 1499. The transmit means 1495, receive means 1497 and control means 1499 may be configured to perform one or more of the functions described in connection with FIG. 3, FIG. 6 and FIG. 11. FIG. 11 above illustrates one example of a concrete apparatus structure of FIG. 14. Other various structures may be implemented to realize one or more of the functions of FIG. 3, FIG. 6 and FIG. 11. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) for dynamically configuring a flexible subframe, comprising:
   a processor;
   memory in electronic communication with the processor, wherein instructions stored in the memory are executable to:
   determine that a subframe is a flexible subframe, wherein determining whether a subframe is a flexible subframe comprises determining whether a subframe type is different in a first reference uplink-downlink (UL-DL) configuration and a second reference UL-DL configuration;

determine whether a downlink is indicated for the flexible subframe by a physical layer signaling, wherein determining whether a downlink is indicated for the flexible subframe comprises monitoring for an indication subframe that is previous to the flexible subframe;

avoid monitoring the flexible subframe when a downlink is not indicated for the flexible subframe; and set the flexible subframe as a downlink subframe if a downlink is indicated by the physical layer signaling.

2. The UE of claim 1, wherein the instructions are further executable to monitor for one or more of a physical downlink control channel (PDCCH) and an enhanced PDCCH (EPDCCH) for a downlink for the flexible subframe in the flexible subframe if a downlink is indicated.

3. The UE of claim 1, wherein the instructions are further executable to avoid monitoring for one or more of a physical downlink control channel (PDCCH) and an enhanced PDCCH (EPDCCH) for a downlink in the flexible subframe if a downlink is not indicated.

4. The UE of claim 1, wherein the indication subframe is a closest downlink subframe before the flexible subframe.

5. A user equipment (UE) for dynamically configuring a flexible subframe, comprising:
   a processor;
   memory in electronic communication with the processor, wherein instructions stored in the memory are executable to:
      determine that a subframe is a flexible subframe, wherein determining whether a subframe is a flexible subframe comprises determining whether a subframe type is different in a first reference uplink-downlink (UL-DL) configuration and a second reference UL-DL configuration;
      monitor for one or more of a physical downlink control channel (PDCCH) and an enhanced PDCCH (EPDCCH) for a downlink for the flexible subframe, wherein monitoring for one or more of a PDCCH and an EPDCCH comprises monitoring for one or more of a PDCCH and an EPDCCH in a scheduling subframe that is previous to the flexible subframe;
      avoid monitoring for one or more of a physical downlink control channel (PDCCH) and an enhanced PDCCH (EPDCCH) for a downlink in the flexible subframe if a downlink is not indicated; and
      determine whether a physical downlink shared channel (PDSCH) is scheduled for the flexible subframe.

6. The UE of claim 5, wherein the scheduling subframe is a closest downlink subframe before the flexible subframe.

7. An evolved Node B (eNB) for dynamically configuring a flexible subframe as a downlink subframe, comprising:
   a processor;
   memory in electronic communication with the processor, wherein instructions stored in the memory are executable to:
      determine that a subframe is a flexible subframe by a physical layer signaling, wherein determining whether a subframe is a flexible subframe comprises determining whether a subframe type is different in a first reference up-link-downlink (UL-DL) configuration and a second reference UL-DL configuration; and
      indicate by a physical layer signaling a downlink for the flexible subframe via an indication subframe that is previous to the flexible subframe.

8. The eNB of claim 7, wherein the indication subframe is a closest downlink subframe before the flexible subframe.

9. The eNB of claim 7, wherein the instructions are further executable to schedule a downlink for the flexible subframe via a scheduling subframe that is previous to the flexible subframe.

10. The eNB of claim 9, wherein indicating the downlink and scheduling the downlink are performed by a physical downlink control channel (PDCCH) or an enhanced PDCCH (EPDCCH) in the scheduling subframe.

11. The eNB of claim 9, wherein indicating the downlink comprises sending a downlink indication in the indication subframe, and wherein scheduling the downlink is performed by a physical downlink control channel (PDCCH) or an enhanced PDCCH (EPDCCH) in the flexible subframe.

12. The eNB of claim 9, wherein scheduling a downlink is based on a physical uplink shared channel (PUSCH) scheduling timing.

13. The eNB of claim 9, wherein scheduling a downlink comprises sending a subframe offset value that indicates a number of subframes between the indication subframe and the flexible subframe.

14. A method for dynamically configuring a flexible subframe by a user equipment (UE), comprising:
   determining, by the UE, that a subframe is a flexible subframe, wherein determining whether a subframe is a flexible subframe comprises determining whether a subframe type is different in a first reference uplink-downlink (UL-DL) configuration and a second reference UL-DL configuration;
   determining, by the UE, whether a downlink is indicated for the flexible subframe by a physical layer signaling, wherein determining whether a downlink is indicated for the flexible subframe comprises monitoring for an indication subframe that is previous to the flexible subframe;
   avoiding monitoring the flexible subframe when a downlink is not indicated for the flexible subframe; and
   setting, by the UE, the flexible subframe as a downlink subframe if a downlink is indicated by the physical layer signaling.

15. The method of claim 14, further comprising monitoring for one or more of a physical downlink control channel (PDCCH) and an enhanced PDCCH (EPDCCH) for a downlink for the flexible subframe in the flexible subframe if a downlink is indicated.

16. The method of claim 14, further comprising avoiding monitoring for one or more of a physical downlink control channel (PDCCH) and an enhanced PDCCH (EPDCCH) for a downlink in the flexible subframe if a downlink is not indicated.

17. The method of claim 14, wherein the indication subframe is a closest downlink subframe before the flexible subframe.

18. A method for dynamically configuring a flexible subframe by a user equipment (UE), comprising:
   determining that a subframe is a flexible subframe, wherein determining whether a subframe is a flexible subframe comprises determining whether a subframe type is different in a first reference uplink-downlink (UL-DL) configuration and a second reference UL-DL configuration;
   monitoring for one or more of a physical downlink control channel (PDCCH) and an enhanced PDCCH (EPDCCH) for a downlink for the flexible subframe, wherein monitoring for one or more of a PDCCH and an EPD-CCH comprises monitoring for one or more of a PDCCH and an EPDCCH in a scheduling subframe that is previous to the flexible subframe;
avoiding monitoring for one or more of a physical downlink control channel (PDCCH) and an enhanced PDCCH (EPDCCH) for a downlink in the flexible subframe if a downlink is not indicated; and
determining whether a physical downlink shared channel (PDSCH) is scheduled for the flexible subframe.

19. The method of claim 18, wherein the scheduling subframe is a closest downlink subframe before the flexible subframe.

20. A method for dynamically configuring a flexible subframe as a downlink subframe by an evolved Node B (eNB), comprising:
determining, by the eNB, that a subframe is a flexible subframe by a physical layer signaling, wherein determining whether a subframe is a flexible subframe comprises determining whether a subframe type is different in a first reference uplink-downlink (UL-DL) configuration and a second reference UL-DL configuration;
indicating by a physical layer signaling, by the eNB, a downlink for the flexible subframe via an indication subframe that is previous to the flexible subframe.

21. The method of claim 20, wherein the indication subframe is a closest downlink subframe before the flexible subframe.

22. The method of claim 20, further comprising scheduling a downlink for the flexible subframe via a scheduling subframe that is previous to the flexible subframe.

23. The method of claim 22, wherein indicating the downlink and scheduling the downlink are performed by a physical downlink control channel (PDCCH) or an enhanced PDCCH (EPDCCH) in the scheduling subframe.

24. The method of claim 22, wherein indicating the downlink comprises sending a downlink indication in the indication subframe, and wherein scheduling the downlink is performed by a physical downlink control channel (PDCCH) or an enhanced PDCCH (EPDCCH) in the flexible subframe.

25. The method of claim 20, wherein scheduling a downlink is based on a physical uplink shared channel (PUSCH) scheduling timing.

26. The method of claim 20, wherein scheduling a downlink comprises sending a subframe offset value that indicates a number of subframes between the indication subframe and the flexible subframe.

* * * * *